United States Patent
Zhang et al.

(10) Patent No.: US 12,114,319 B2
(45) Date of Patent: Oct. 8, 2024

(54) SIGNAL TRANSMISSION METHOD AND APPARATUS

(71) Applicant: Huawei Technologies Co., Ltd., Shenzhen (CN)

(72) Inventors: Di Zhang, Shenzhen (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 407 days.

(21) Appl. No.: 17/372,222

(22) Filed: Jul. 9, 2021

(65) Prior Publication Data

US 2021/0337584 A1  Oct. 28, 2021

Related U.S. Application Data

(63) Continuation of application No. PCT/CN2020/071526, filed on Jan. 10, 2020.

(30) Foreign Application Priority Data

Jan. 11, 2019  (CN) .......................... 201910028826.1
Dec. 2, 2019   (CN) .......................... 201911215742.5

(51) Int. Cl.
*H04W 72/23*  (2023.01)
*H04L 5/00*   (2006.01)
(Continued)

(52) U.S. Cl.
CPC ........... *H04W 72/23* (2023.01); *H04L 5/0051* (2013.01); *H04W 16/28* (2013.01);
(Continued)

(58) Field of Classification Search
CPC ............. H04W 72/23; H04W 72/0446; H04W 72/046; H04W 80/02; H04L 5/0051
See application file for complete search history.

(56) References Cited

U.S. PATENT DOCUMENTS

2017/0295504 A1  10/2017  Yoo et al.
2019/0297637 A1*  9/2019  Liou ................. H04W 72/1273
(Continued)

FOREIGN PATENT DOCUMENTS

CN  108199819 A  6/2018
CN  109150272 A  1/2019
(Continued)

OTHER PUBLICATIONS

U.S. Appl. No. 62/648,194, pp. 46, 47, 63, 75, 80, 94, 98-102, 104, 105, 108, 109, 113, 114 filed Mar. 26, 2018.*
Huawei, HiSilicon, "Further details on beam indication," 3GPP TSG RAN WG1 Meeting #91, Reno, USA, R1-1719806, total 12 pages, 3rd Generation Partnership Project, Valbonne, France (Nov. 27-Dec. 1, 2017).
(Continued)

*Primary Examiner* — Jackie Zuniga Abad
(74) *Attorney, Agent, or Firm* — Leydig, Voit & Mayer, Ltd.

(57) ABSTRACT

A reference signal transmission method is disclosed, the method including: determining at least two first reference signal resources; receiving a first channel based on the at least two first reference signal resources when a scheduling offset is less than or equal to a preset threshold and/or there is no spatial relation parameter information indication field in downlink control information DCI; and demodulating the first channel. When data on at least two reference signal resources needs to be received within a period of time, the method can increase a probability that a terminal device successfully receives the data.

14 Claims, 3 Drawing Sheets

(51) Int. Cl.
    *H04W 16/28* (2009.01)
    *H04W 72/044* (2023.01)
    *H04W 72/0446* (2023.01)
    *H04W 80/02* (2009.01)

(52) U.S. Cl.
    CPC ..... *H04W 72/0446* (2013.01); *H04W 72/046* (2013.01); *H04W 80/02* (2013.01)

(56) References Cited

U.S. PATENT DOCUMENTS

| | | | | |
|---|---|---|---|---|
| 2020/0195334 | A1* | 6/2020 | Zhou | H04B 7/0695 |
| 2021/0391899 | A1* | 12/2021 | Cao | H04B 17/373 |
| 2022/0116247 | A1* | 4/2022 | Sengupta | H04L 5/0094 |

FOREIGN PATENT DOCUMENTS

| | | |
|---|---|---|
| WO | 2018128351 A1 | 7/2018 |
| WO | 2018228532 A1 | 12/2018 |

OTHER PUBLICATIONS

"Draft CR on TS38.214 on CORESET 0," 3GPP TSG-RAN1 Meeting #95, Spokane, USA, R1-1814052, Total 5 pages, 3rd Generation Partnership Project, Valbonne, France (Nov. 12-16, 2018).

"3rd Generation Partnership Project; Technical Specification Group Radio Access Network; NR; Physical layer procedures for control (Release 15)," 3GPP TS 38.213 V15.3.0, pp. 1-101, 3rd Generation Partnership Project, Valbonne, France (Sep. 2018).

"3rd Generation Partnership Project; Technical Specification Group Radio Access Network; NR; Radio Resource Control (RRC) protocol specification (Release 15)," 3GPP TS 38.331 V15.3.0, pp. 1-445, 3rd Generation Partnership Project, Valbonne, France (Sep. 2018).

"3rd Generation Partnership Project; Technical Specification Group Radio Access Network; NR; Physical layer procedures for data (Release 15)," 3GPP TS 38.214 V15.3.0, pp. 1-96, 3rd Generation Partnership Project, Valbonne, France (Sep. 2018).

* cited by examiner

SIGNAL TRANSMISSION METHOD AND APPARATUS

CROSS-REFERENCE TO RELATED APPLICATIONS

This application is a continuation of International Application No. PCT/CN2020/071526, file on Jan. 10, 2020, which claims priority to Chinese Patent Application No. 201910028826.1, filed on Jan. 11, 2019 and Chinese Patent Application No. 201911215742.5, filed on Dec. 2, 2019. All of the aforementioned patent applications are hereby incorporated by reference in their entireties.

TECHNICAL FIELD

This application relates to the communications field, and more specifically, to a signal transmission method and apparatus.

BACKGROUND

In beam training, a user equipment (UE) measures a plurality of transmit beams sent by a network device, selects N optimal beams from the plurality of transmit beams, uses the N beams as receive beams determined by the UE, and reports the N optimal beams to the network device by using beam state information (BSI).

Because the receive beams reported by the UE to the network device may include a plurality of beams, the network device may indicate an available receive beam to the UE by sending beam indication information to the UE.

In a known beam indication method, only a transmission manner in which only one network device communicates with UE by using one beam at a specific moment is considered. However, a new radio (NR) system may support the network device in communicating with one UE by simultaneously using different beams.

In this case, if the UE has only one available receive beam, for data that is not carried on the receive beam, the UE may have relatively poor performance of receiving data carried on another receive beam, or the UE cannot receive data carried on another receive beam.

SUMMARY

This application provides a signal transmission method. When data on at least two reference signal resources needs to be received within a period of time, the method can increase a probability that a terminal device successfully receives the data.

According to a first aspect, a signal transmission method is provided. The method may be performed by a terminal device, or may be performed by a chip disposed in a terminal device. This is not limited in this application.

Specifically, the method includes: determining at least two first reference signal resources; receiving a first channel based on the at least two first reference signal resources when a scheduling offset is less than or equal to a preset threshold and/or there is no spatial relation parameter information indication field in downlink control information (DCI); and demodulating the first channel.

Based on the foregoing technical solution, when the scheduling offset is less than or equal to the preset threshold and/or there is no spatial relation parameter information indication field in the downlink control information DCI, the terminal device determines at least two reference signal resources (for example, the at least two first reference signal resources), and receives the first channel on the at least two first reference signal resources, so that when data on the at least two reference signal resources needs to be received within a period of time, the terminal device receives the first channel based on the at least two first reference signal resources. In this way, a probability that the terminal device successfully receives the data is increased.

It should be noted that the scheduling offset is an offset between a receiving moment of DCI for scheduling the first channel and a receiving moment of the first channel. For example, the receiving moment of the DCI for scheduling the first channel is n+k, and the receiving moment of the first channel is n. In this case, the offset between the receiving moment of the DCI for scheduling the first channel and the receiving moment of the first channel is k.

In a possible implementation, the at least two first reference signal resources may be reference signal resources that are last reported by the terminal device, and at least two reference signals carried on the at least two first reference signal resources are reference signals that can be simultaneously received.

It should be understood that in this embodiment of this application, simultaneous receiving means receiving at a same moment, receiving at an overlapping moment, receiving in a same time unit, or receiving in at least one overlapping time unit, and a plurality of reference signals overlap in at least one time unit. The time unit may be one or more radio frames, one or more subframes, one or more slots, one or more mini slots, or one or more orthogonal frequency division multiplexing (OFDM) symbols defined in an LTE system or a 5G NR system, or may be a time window including a plurality of frames or subframes, for example, a system information (SI) window. The following embodiment is described by using an example in which the reference signals that are simultaneously received are reference signals received on one or more OFDM symbols. This is not limited in this application.

In a possible implementation, the at least two first reference signal resources may be obtained by the terminal device based on spatial relation parameter information (for example, first spatial relation parameter information), and the first spatial relation parameter information may indicate at least two reference signal resources, and may further indicate a type that is of a spatial relation parameter and that is associated with the at least two reference signal resources.

For example, the first spatial relation parameter information indicates at least two channel state information reference signal (CSI-RS) resources, and the first spatial relation parameter information further indicates a type that is of a spatial relation parameter and that is associated with the at least two CSI-RS resources. For example, when the type that is of the spatial relation parameter, that is associated with the at least two CSI-RS resources, and that is included in the first spatial relation parameter information is a quasi-colocation (QCL) type D, the terminal device determines the at least two CSI-RS resources as the at least two first reference signal resources.

In a possible implementation, the terminal device may receive, by using radio resource control (RRC) signaling or media access control (MAC) control element (CE) signaling, configuration information sent by a network device, and obtain the first spatial relation parameter information based on the configuration information, where the configuration information indicates the first spatial relation parameter information. Correspondingly, the network device may send the configuration information to the terminal device by using the RRC signaling or the MAC CE signaling.

For example, the configuration information may include one or at least two transmission configuration indicator state (TCI-state) IDs, a TCI state indicated by a TCI state ID may include an identifier of at least one reference signal resource and a type that is of a spatial relation parameter and that is associated with the at least one reference signal resource, and the identifier may be an index value of the reference signal resource. When the configuration information includes one TCI state ID, a TCI state indicated by the TCI state ID may include index values of at least two reference signal resources and a type that is of a spatial relation parameter and that is associated with the at least two reference signal resources. When the configuration information includes at least two TCI state IDs, a TCI state indicated by each TCI state ID may include an identifier of at least one reference signal resource and a type that is of a spatial relation parameter and that is associated with the at least one reference signal resource. This is not limited in this application.

It should be noted that the TCI states indicated by the configuration information may be some TCI states in a TCI state list of a PDSCH, some TCI states in a TCI state list of a PDCCH, or some TCI states in activated TCI states of a PDSCH.

In a possible implementation, the demodulating the first channel includes:

obtaining second spatial relation parameter information, where the second spatial relation parameter information indicates at least two second reference signal resources and a QCL type associated with the at least two second reference signal resources, and the QCL type associated with the at least two second reference signal resources includes at least one of a QCL type A, a QCL type B, and a QCL type C; determining at least one second reference signal resource from the at least two second reference signal resources as a target reference signal resource; and demodulating the first channel based on the target reference signal resource.

In a possible implementation, the terminal device may receive, by using RRC signaling or MAC CE signaling, configuration information sent by a network device, and obtain the second spatial relation parameter information based on the configuration information, where the configuration information indicates the second spatial relation parameter information. Correspondingly, the network device may send the configuration information to the terminal device by using the RRC signaling or the MAC CE signaling.

For example, the configuration information may include one or at least two TCI state IDs, a TCI state indicated by a TCI state ID may include an identifier of at least one reference signal resource and a type that is of a spatial relation parameter and that is associated with the at least one reference signal resource, and the identifier may be an index value of the reference signal resource. When the configuration information includes one TCI state ID, a TCI state indicated by the TCI state ID may include index values of at least two reference signal resources and a type that is of a spatial relation parameter and that is associated with the at least two reference signal resources. When the configuration information includes at least two TCI state IDs, a TCI state indicated by each TCI state ID may include an identifier of at least one reference signal resource and a type that is of a spatial relation parameter and that is associated with the at least one reference signal resource. This is not limited in this application.

It should be noted that in this application, when one TCI state indicates the first spatial relation parameter information or the second spatial relation parameter information, if the TCI state includes at least two reference signal resources, and the at least two reference signal resources are associated with a same type of a spatial relation parameter, the TCI state may include only one QCL type. For example, when the TCI state includes index values of at least two CSI-RS resources, and the at least two CSI-RS resources are associated with a same QCL type C of a spatial relation parameter, the TCI state may include only one QCL type C.

It should be further noted that in this application, the first spatial relation parameter information and the second spatial relation parameter information may be indicated by using a same TCI state or two same TCI states. For example, one TCI state may include the at least two first reference signal resources and the at least two second reference signal resources, a type that is of a spatial relation parameter and that is associated with the at least two first reference signal resources may be a QCL type D, and a type that is of a spatial relation parameter and that is associated with the at least two second reference signal resources may be any one of a QCL type A, a QCL type B, and a QCL type C. For another example, one TCI state may include at least one of the at least two first reference signal resources and at least one of the at least two second reference signal resources, a type that is of a spatial relation parameter and that is associated with the at least one first reference signal resource may be a QCL type D, and a type that is of a spatial relation parameter and that is associated with the at least one second reference signal resource may be any one of a QCL type A, a QCL type B, and a QCL type C. The other TCI state includes at least one other first reference signal resource in the at least two first reference signal resources and at least one other second reference signal resource in the at least two second reference signal resources, a type that is of a spatial relation parameter and that is associated with the at least one other first reference signal resource may be a QCL type D, and a type that is of a spatial relation parameter and that is associated with the at least one other second reference signal resource may be any one of a QCL type A, a QCL type B, and a QCL type C. In a possible implementation, the demodulating the first channel includes: determining at least one reference signal resource from the at least two first reference signal resources as a target reference signal resource; and demodulating the first channel based on the target reference signal resource.

In a possible implementation, the determining at least one second reference signal resource from the at least two second reference signal resources as a target reference signal resource includes: determining the at least one second reference signal resource from the at least two second reference signal resources as the target reference signal resource based on first information, where the first information is information about DCI for scheduling the first channel.

In a possible implementation, the determining at least one reference signal resource from the at least two first reference signal resources as a target reference signal resource includes: determining the at least one reference signal resource from the at least two first reference signal resources as the target reference signal resource based on first information, where the first information is information about DCI for scheduling the first channel.

In a possible implementation, the first information includes at least one of the following:
an index number of a control resource set in which the DCI for scheduling the first channel is located;
an index number of a search space set in which the DCI for scheduling the first channel is located;
an antenna port field carried in the DCI for scheduling the first channel;
a transport block field carried in the DCI for scheduling the first channel;
repetition times indication information carried in the DCI for scheduling the first channel; and
a transmission configuration indicator field carried in the DCI for scheduling the first channel.

In a possible implementation, the determining a target reference signal resource includes:
determining, based on association information, at least one reference signal resource that has an association relationship with the first information as the target reference signal resource, where the association relationship indicates an association relationship between a plurality of reference signal resources and a plurality of pieces of second information, the second information includes at least one of the following information: an index number of an antenna port, an index number of a code division multiplexing antenna port group to which the antenna port belongs, an index number of a control resource set CORESET to which a resource carrying DCI belongs, and an index number of a search space set to which the resource carrying the DCI belongs, and the first information is one of the plurality of pieces of second information.

Optionally, in a multi-TRP scenario, one PDSCH scheduled by using one piece of DCI may be from one or more TRPs. In a possible implementation, whether the PDSCH may be from one or two TRPs is determined based on a TCI field in the DCI.

It should be understood that the at least one reference signal resource is determined from the at least two first reference signal resources as the target reference signal resource based on the transmission configuration indicator field carried in the DCI for scheduling the first channel. In a possible implementation, the at least one reference signal resource is determined from the at least two first reference signal resources as the target reference signal resource based on a quantity of TCI states indicated in the transmission configuration indicator field carried in the DCI for scheduling the first channel (or based on a maximum quantity of TCI states indicated by each codepoint in all candidate codepoints in the transmission configuration indicator field in the DCI). In another possible implementation, the at least one reference signal resource is determined from the at least two first reference signal resources as the target reference signal resource based on a quantity of TCI states indicated in the transmission configuration indicator field carried in the DCI for scheduling the first channel and whether the TCI states are the same.

Alternatively, the at least one reference signal resource is determined from the at least two second reference signal resources as the target reference signal resource based on the transmission configuration indicator field carried in the DCI for scheduling the first channel. In a possible implementation, the at least one reference signal resource is determined from the at least two second reference signal resources as the target reference signal resource based on a quantity of TCI states indicated in the transmission configuration indicator field carried in the DCI for scheduling the first channel (or based on a maximum quantity of TCI states indicated by each codepoint in all candidate codepoints in the transmission configuration indicator field in the DCI). In another possible implementation, the at least one reference signal resource is determined from the at least two second reference signal resources as the target reference signal resource based on a quantity of TCI states indicated in the transmission configuration indicator field carried in the DCI for scheduling the first channel and whether the TCI states are the same.

It should be understood that in the following embodiment or implementation, "determining at least one reference signal resource from the at least two second reference signal resources as a target reference signal resource" may be "determining a reference signal resource indicated by at least one of two default transmission configuration indicator states as a target reference signal resource", or may be "determining at least one reference signal resource from the at least two first reference signal resources as a target reference signal resource".

In this embodiment of this application, the two default TCI states may be defined, and type D QCL information (which may indicate the foregoing at least two first reference signal resources) indicated by the two TCI states is used to cache data. After the DCI is decoded, at least one of type A/B/C QCL information (which may indicate the foregoing at least two second reference signal resources) indicated by the two TCI states may be used to demodulate the PDSCH.

Optionally, type D QCL information of a PDSCH DMRS port may be the type D QCL information indicated by the two default TCI states, and type A/B/C QCL information of the PDSCH DMRS port may be determined based on an indication value in the TCI field included in the DCI for scheduling the PDSCH.

It should be understood that the two default TCI states may be a first TCI state and a second TCI state. The first TCI state and the second TCI state may be implemented in a plurality of manners.

For example, the first TCI state may be a TCI state of a CORESET with a smallest identifier in a latest slot, and the second TCI state may correspond to a type D QCL RS in an activated TCI state and a type D QCL RS in the TCI state of the CORESET with the smallest identifier in the latest slot. The two reference signal resources (type D QCL RSs corresponding to the two TCI states) may be reported together in one packet, and the two reference signal resources reported in one packet are reference signal resources that can be simultaneously received by the terminal device.

For another example, the first TCI state is a TCI state of a CORESET with a smallest identifier in a latest slot, and the second TCI state is a TCI state that is activated by a MAC CE and that is paired with the first TCI state.

For another example, in all codepoints in the transmission configuration indicator field in the DCI, two TCI states indicated by a codepoint with a smallest codepoint value in codepoints indicating two TCI states are used as the two default TCI states.

It should be understood that the two TCI states may alternatively be determined in another manner. This is not limited in this application.

In a possible implementation, that the at least one reference signal resource is determined from the at least two second reference signal resources as the target reference signal resource based on the transmission configuration indicator field carried in the DCI for scheduling the first channel includes:

when a quantity of transmission configuration indicator states (TCI state) indicated in the transmission configuration indicator field is 1, determining a $1^{st}$ second reference signal resource in the at least two second reference signal resources as the target reference signal resource; or when a quantity of transmission configuration indicator states (TCI state) indicated in the transmission configuration indicator field is 2, determining two of the at least two second reference signal resources as the target reference signal resources.

In a possible implementation, when the scheduling offset is less than or equal to the preset threshold, the terminal device may determine the two TCI states, assumes that the type D QCL information of the first channel or the type D QCL information of the DMRS port of the first channel is the same as the type D QCL information indicated by the two TCI states, and determines, from the two TCI states, one of the type A QCL information, the type B QCL information, and the type C QCL information of the first channel based on the value in the TCI field carried in the DCI for scheduling the first channel or the quantity of TCI states indicated in the TCI field carried in the DCI for scheduling the first channel.

Optionally, when one piece of DCI is used to schedule a plurality of TRPs, there is a TCI field, and the scheduling offset is less than K, the terminal device determines, based on the TCI field in the DCI for scheduling the PDSCH, the type A/B/C QCL information for demodulating the PDSCH. The following describes the process in detail.

1. The terminal device determines that two pieces of type D QCL information in the two default TCI states are used to receive a PDSCH whose scheduling offset is less than K.

2. The terminal device determines, based on information about the TCI field in the DCI for scheduling the PDSCH, the type A/B/C QCL information indicated by at least one of the two default TCI states, to demodulate the PDSCH.

It should be understood that when the information about the TCI field indicates that there is one TCI state, the terminal device may demodulate the PDSCH based on the type A/B/C QCL information indicated by the first TCI state in the default TCI states. When the information about the TCI field indicates that there are two TCI states, the terminal device may demodulate the PDSCH based on the type A/B/C QCL information indicated by the two TCI states in the default TCI states.

For example, the UE determines that the default TCI states are TCI n1 {type A RS a1, type D RS b1}+TCI m1 {type A RS c1, type D RS d1}. The value in the TCI field indicated by the DCI for scheduling the PDSCH is 001, that is, the DCI indicates TCI n2 {type A RS a2, type D RS b2}. In this case, the UE demodulates the PDSCH based on {type A RS a1} indicated by TCI n1.

In another possible implementation, that the at least one reference signal resource is determined from the at least two second reference signal resources as the target reference signal resource based on the antenna port field carried in the DCI for scheduling the first channel includes:

when a quantity of CDM groups to which DMRS ports indicated in the antenna port field belong is 1, determining a $1^{st}$ second reference signal resource in the at least two second reference signal resources as the target reference signal resource; or when a quantity of CDM groups to which DMRS ports indicated in the antenna port field belong is 2 (or 3), determining two of the at least two second reference signal resources as the target reference signal resources.

In another possible implementation, that the at least one reference signal resource is determined from the at least two second reference signal resources as the target reference signal resource based on the antenna port field and the transmission configuration indicator field that are carried in the DCI for scheduling the first channel includes:

when a quantity of CDM groups to which DMRS ports indicated in the antenna port field belong is 1 and a quantity of transmission configuration indicator states (TCI state) indicated in the transmission configuration indicator field is 1, determining a $1^{st}$ second reference signal resource in the at least two second reference signal resources as the target reference signal resource; or when a quantity of CDM groups to which DMRS ports indicated in the antenna port field belong is 1 and a quantity of transmission configuration indicator states (TCI state) indicated in the transmission configuration indicator field is 2, determining two of the at least two second reference signal resources as the target reference signal resources.

In another possible implementation, the target reference signal resource is determined based on repetition times of the first channel that are indicated by the repetition times indication information. For example, if the repetition times indicated by the repetition times indication information are N, N first channels or N time-frequency resources are currently scheduled, where all the first channels or all the time-frequency resources are used to carry a same transport block (Transmission Block, TB).

In another possible implementation, that the at least one reference signal resource is determined from the at least two second reference signal resources as the target reference signal resource based on the repetition times indication information and the transmission configuration indicator field that are carried in the DCI for scheduling the first channel includes:

when repetition times indicated by the repetition times indication information are 1 or in a default state and a quantity of transmission configuration indicator states (TCI state) indicated in the transmission configuration indicator field is 1, determining a $1^{st}$ second reference signal resource in the at least two second reference signal resources as the target reference signal resource;

when repetition times indicated by the repetition times indication information are 1 or in a default state and a quantity of transmission configuration indicator states (TCI state) indicated in the transmission configuration indicator field is 2, determining two of the at least two second reference signal resources as the target reference signal resources; or when repetition times indicated by the repetition times indication information are greater than or equal to 2 and a quantity of transmission configuration indicator states (TCI state) indicated in the transmission configuration indicator field is 2, determining two of the at least two second reference signal resources as the target reference signal resources.

In another possible implementation, that at least two reference signal resources are determined from the at least two second reference signal resources as target reference signal resources based on transmission mechanism indication information and the transmission configuration indicator field carried in the DCI for scheduling the first channel includes:

when the transmission mechanism indication information indicates repeated transmission and a quantity of transmission configuration indicator states (TCI state) indicated in the transmission configuration indicator field is 2, determining reference signal resources on a second channel as the target reference signal resources; or when the transmission mechanism indication information does not indicate repeated transmission and a quantity of transmission configuration indicator states (TCI state) indicated in the transmission configuration indicator field is 2, determining reference signal resources on a second channel as the target reference signal resources.

Optionally, the repeated transmission indicated by the transmission mechanism indication information means that two frequency domain resource blocks indicated by the DCI for scheduling the first channel respectively correspond to different TCI states.

Optionally, the two frequency domain resource blocks carry a same TB.

Optionally, the different TCI states are the foregoing two default TCI states.

Optionally, the repeated transmission indicated by the transmission mechanism indication information means that two TCI states respectively correspond to two time domain resource blocks indicated by the DCI for scheduling the first channel.

Optionally, the two time domain resource blocks carry a same TB.

Optionally, the two time domain resource blocks are located in a same slot.

The foregoing technical solution may be applied to the multi-TRP scenario. When the scheduling offset is less than the preset threshold, the terminal device obtains the DCI through decoding, and may learn whether the PDSCH is data transmitted by a single TRP or data transmitted by a plurality of TRPs, to determine a correspondence between the PDSCH DMRS port and the TCI state or the QCL information.

It should be understood that the embodiments of this application may be further applied to another scenario. For example, a plurality of pieces of DCI may be used to schedule PDSCHs from different TRPs at different moments or at a same moment. When the scheduling offset is less than the preset threshold, the terminal device may determine, based on an index number of a CORESET in which the current DCI is located, the TCI state or the QCL information of the PDSCH scheduled by using the DCI. For example, the terminal device determines, as the TCI state of the PDSCH, a TCI state of a CORESET with a smallest index in CORESETs associated with the CORESET; or determines, as the TCI state of the PDSCH, a TCI state of a CORESET that is in a slot closest to the DCI and that has a smallest CORESET index in CORESETs associated with the CORESET.

According to a second aspect, a signal transmission method is provided. The method may be performed by a network device, or may be performed by a chip disposed in a network device. This is not limited in this application.

Specifically, the method includes: obtaining configuration information, where the configuration information indicates the first spatial relation parameter information, and the first spatial relation parameter information indicates at least two reference signal resources and indicates that a type that is of a spatial relation parameter and that is associated with the at least two reference signal resources is a QCL type D; sending the configuration information by using radio resource control RRC signaling or media access control control element MAC CE signaling; and sending a first channel based on at least two first reference signal resources, where the at least two first reference signal resources are the at least two reference signal resources.

It should be noted that the configuration information may be generated by the network device, or the configuration information may be obtained by the network device from another network element or module. This is not specifically limited in this application.

Based on the foregoing technical solution, when a scheduling offset is less than or equal to a preset threshold and/or there is no spatial relation parameter information indication field in downlink control information DCI, a terminal device determines the at least two reference signal resources (for example, the at least two first reference signal resources), and receives the first channel on the at least two first reference signal resources, so that when data on the at least two reference signal resources needs to be received within a period of time, the terminal device receives the first channel based on the at least two first reference signal resources. In this way, a probability that the terminal device successfully receives the data is increased.

In a possible implementation, the configuration information is further used to indicate second spatial relation parameter information, the second spatial relation parameter information indicates at least two second reference signal resources and a QCL type associated with the at least two second reference signal resources, and the QCL type associated with the at least two second reference signal resources includes at least one of a QCL type A, a QCL type B, and a QCL type C.

In a possible implementation, the method further includes: sending association information to the terminal device by using the RRC signaling or the MAC CE signaling, where the association information indicates an association relationship between a plurality of reference signal resources and a plurality of pieces of second information, the second information includes at least one of the following information: an index number of an antenna port, an index number of a code division multiplexing antenna port group to which the antenna port belongs, an index number of a control resource set CORESET to which a resource carrying DCI belongs, and an index number of a search space set to which the resource carrying the DCI belongs, and the plurality of pieces of second information include first information.

In a possible implementation, the first information includes at least one of the following:

an index number of a control resource set in which the DCI for scheduling the first channel is located;

an index number of a search space set in which the DCI for scheduling the first channel is located;

an antenna port field carried in the DCI for scheduling the first channel;

a transport block field carried in the DCI for scheduling the first channel;

repetition times indication information carried in the DCI for scheduling the first channel; and a transmission configuration indicator field carried in the DCI for scheduling the first channel.

According to a third aspect, a signal transmission method is provided. The method may be performed by a terminal device, or may be performed by a chip disposed in a terminal device. This is not limited in this application.

Specifically, the method includes: obtaining two transmission configuration indicator states; determining one of the two transmission configuration indicator states as a target transmission configuration indicator state based on first information; and sending or receiving a first channel based on the target transmission configuration indicator state when an offset between a receiving moment of downlink control information DCI for scheduling the first channel and a receiving moment of the first channel is less than or equal to a preset threshold.

In a possible implementation, the first information includes at least one of the following:

an index number of a control resource set in which the DCI for scheduling the first channel is located;

an index number of a search space set in which the DCI for scheduling the first channel is located;

an antenna port field carried in the DCI for scheduling the first channel;

a transport block field carried in the DCI for scheduling the first channel;

repetition times indication information carried in the DCI for scheduling the first channel; and a transmission configuration indicator field carried in the DCI for scheduling the first channel.

In another possible implementation, the target transmission configuration indicator state is a transmission configuration indicator state corresponding to a CORESET that is in a slot closest to the first channel and that has a smallest index value in CORESETs having an association relationship with the first information.

According to a fourth aspect, a signal transmission apparatus is provided. The signal transmission apparatus includes modules or units configured to perform the method according to any one of the possible implementations of the first aspect or the third aspect.

According to a fifth aspect, a signal transmission apparatus is provided. The signal transmission apparatus may be the terminal device in the foregoing method designs, or may be a chip disposed in the terminal device. The signal transmission apparatus includes a processor. The processor is coupled to a memory, and may be configured to execute instructions in the memory, to implement the method according to any one of the possible implementations of the first aspect or the third aspect. Optionally, the signal transmission apparatus further includes the memory. Optionally, the signal transmission apparatus further includes a communications interface, and the processor is coupled to the communications interface.

In an implementation, the signal transmission apparatus is a terminal device. When the signal transmission apparatus is the terminal device, the communications interface may be a transceiver or an input/output interface.

In another implementation, the signal transmission apparatus is a chip disposed in the terminal device. When the signal transmission apparatus is the chip disposed in the terminal device, the communications interface may be an input/output interface.

Optionally, the transceiver may be a transceiver circuit. Optionally, the input/output interface may be an input/output circuit.

According to a sixth aspect, a signal transmission apparatus is provided. The signal transmission apparatus includes modules or units configured to perform the method according to any one of the possible implementations of the second aspect.

According to a seventh aspect, a signal transmission apparatus is provided. The signal transmission apparatus may be the network device in the foregoing method designs, or may be a chip disposed in the network device. The signal transmission apparatus includes a processor. The processor is coupled to a memory, and may be configured to execute instructions in the memory, to implement the method according to any one of the possible implementations of the second aspect or the third aspect. Optionally, the signal transmission apparatus further includes the memory. Optionally, the signal transmission apparatus further includes a communications interface, and the processor is coupled to the communications interface.

In an implementation, the signal transmission apparatus is a network device. When the signal transmission apparatus is the network device, the communications interface may be a transceiver or an input/output interface.

In another implementation, the signal transmission apparatus is a chip disposed in the network device. When the signal transmission apparatus is the chip disposed in the network device, the communications interface may be an input/output interface.

Optionally, the transceiver may be a transceiver circuit. Optionally, the input/output interface may be an input/output circuit.

According to an eighth aspect, a computer program product is provided. The computer program product includes a computer program (which may also be referred to as code or instructions). When the computer program is run, a computer is enabled to perform the method according to any one of the possible implementations of the first aspect, the second aspect, or the third aspect.

According to a ninth aspect, a computer readable medium is provided. The computer readable medium stores a computer program (which may also be referred to as code or instructions). When the computer program is run on a computer, the computer is enabled to perform the method according to any one of the possible implementations of the first aspect, the second aspect, or the third aspect.

DESCRIPTION OF EMBODIMENTS

The following describes technical solutions in this application with reference to the accompanying drawings.

The technical solutions in this application may be applied to various communications systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

For ease of understanding this application, a communications system applicable to this application is first described in detail with reference to FIG. 1.

Figure 1:
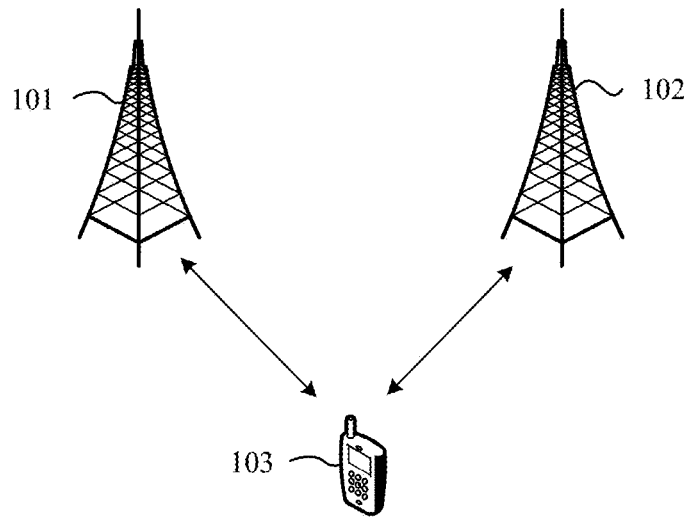
FIG. 1 is a schematic diagram of a communications system to which an embodiment of this application is applicable.

FIG. 1 is a schematic diagram of a communications system 100 applicable to a signal sending and receiving method and apparatus according to an embodiment of this application. As shown in the figure, the communications system 100 may include at least two network devices such as network devices 110 and 120 shown in FIG. 1. The communications system 100 may further include at least one terminal device such as a terminal device 130 shown in FIG. 1. The terminal device 130 may establish a radio link with the network device 110 and the network device 120 by using a dual connectivity (DC) technology or a multi-connectivity technology. The network device 110 may be, for example, a primary base station, and the network device 110 may be, for example, a secondary base station. In this case, the network device 110 is a network device initially accessed by the terminal device 130, and is responsible for radio resource control (RRC) communication with the terminal device 130. The network device 120 may be added during RRC reconfiguration, and is configured to provide an additional radio resource.

Certainly, the network device 120 may alternatively be a primary base station, and the network device 110 may alternatively be a secondary base station. This is not limited in this application. In addition, for ease of understanding, the figure shows only a case in which the two network devices are connected to the terminal device in a wireless manner. However, this should not constitute any limitation on a scenario to which this application is applicable. The terminal device may further establish radio links with more network devices.

A plurality of antennas may be configured for each communications device such as the network device 110, the network device 120, or the terminal device 130 in FIG. 1. The plurality of antennas may include at least one transmit antenna used to send a signal and at least one receive antenna used to receive a signal. In addition, each communications device additionally includes a transmitter chain and a receiver chain. A person of ordinary skill in the art may understand that the transmitter chain and the receiver chain each may include a plurality of components related to signal sending and receiving (for example, a processor, a modulator, a multiplexer, a demodulator, a demultiplexer, or an antenna). Therefore, the network device and the terminal device may communicate with each other by using a multiple-antenna technology.

It should be understood that the network device in the wireless communications system may be any device that has a wireless transceiver function. The device includes but is not limited to an evolved NodeB (eNB), a radio network controller (RNC), a NodeB (NB), a base station controller (BSC), a base transceiver station (BTS), a home base station (for example, a home evolved NodeB, or a home NodeB, or a HNB), a baseband unit (BBU), an access point (AP) in a wireless fidelity (WIFI) system, a wireless relay node, a wireless backhaul node, or the like. The device may alternatively be a gNB in a 5G system, for example, an NR system, or one or one group of antenna panels (including a plurality of antenna panels) of a base station in a 5G system. The device may alternatively be a network node, for example, a baseband unit (BBU) or a distributed unit (DU), that constitutes a gNB or a transmission point.

In some deployments, the gNB may include a centralized unit (CU) and a DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer finally becomes information at the PHY layer or is transformed from information at the PHY layer. Therefore, in such an architecture, it may be considered that higher layer signaling such as RRC signaling is sent by the DU or is sent by the DU and the CU. It may be understood that the network device may be the CU node, the DU node, or a device including the CU node and the DU node. In addition, the CU may be classified as a network device in an access network (RAN), or the CU may be classified as a network device in a core network (CN). This is not limited in this application.

It should be further understood that the terminal device in the wireless communications system may also be referred to as a user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone, a tablet computer, a computer having a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application.

For ease of understanding the embodiments of this application, the following first briefly describes some terms in this application.

1. Beam: The beam in an NR protocol may be embodied as a spatial domain filter (spatial filter) that is also referred to as a spatial filter or a spatial parameter. A beam used to send a signal may be referred to as a transmit beam (transmission beam, Tx beam), or may be referred to as a spatial domain transmit filter or a spatial domain transmit parameter. A beam used to receive a signal may be referred to as a receive beam (reception beam, Rx beam), or may be referred to as a spatial domain receive filter or a spatial domain receive parameter.

Optionally, the beam may alternatively correspond to a spatial domain filter (spatial filter/spatial domain filter), a spatial domain transmission filter, a spatial filter, or a spatial transmission filter. The receive beam is equivalent to a spatial transmission filter, a spatial domain transmission filter, a spatial domain receive filter, or a spatial receive filter. The transmit beam may be equivalent to a spatial domain filter, a spatial domain transmission filter, a spatial domain transmit filter, or a spatial transmit filter. Information about a spatial relation parameter is equivalent to a spatial filter (spatial domain transmission/receive filter).

Further, the spatial filter usually includes a spatial transmit filter and/or a spatial receive filter. The spatial filter may also be referred to as a spatial domain transmit filter, a spatial domain receive filter, a spatial transmission filter, a spatial domain transmission filter, or the like. Optionally, a receive beam on the terminal side and a transmit beam on the network device side may serve as downlink spatial filters, and a transmit beam on the terminal side and a receive beam on the network device side may serve as uplink spatial filters.

The transmit beam may refer to distribution of signal strength formed in different directions in space after a signal is transmitted through an antenna, and the receive beam may refer to distribution of signal strength that is of a radio signal received from an antenna and that is in different directions in space.

It should be understood that the foregoing enumerated embodiers of the beam in the NR protocol are merely examples, and shall not constitute any limitation on this application. This application does not exclude a possibility that another term is defined in a future protocol to represent a same or similar meaning.

In addition, the beam may be a wide beam, a narrow beam, or a beam of another type. A technology for forming the beam may be a beamforming technology or another technology. The beamforming technology may be specifically a digital beamforming technology, an analog beamforming technology, a hybrid digital/analog beamforming technology, or the like. Different beams may be considered as different resources. Same information or different information may be sent by using different beams.

Optionally, a plurality of beams that have a same or similar communication feature are considered as one beam. One beam may include one or more antenna ports configured to transmit a data channel, a control channel, a sounding signal, and the like. The one or more antenna ports forming the beam may also be considered as one antenna port set.

2. Beam pairing relationship: The beam pairing relationship is a pairing relationship between a transmit beam and a receive beam, namely, a pairing relationship between a spatial domain transmit filter and a spatial domain receive filter. A relatively large beamforming gain can be obtained by transmitting a signal between the transmit beam and the receive beam that have the beam pairing relationship.

In an implementation, a transmit end and a receive end may obtain the beam pairing relationship through beam training. Specifically, the transmit end may send a reference signal through beam sweeping, and the receive end may also receive a reference signal through beam sweeping. Specifically, the transmit end may form different directional beams in space through beamforming, and may perform polling on a plurality of different directional beams, to transmit the reference signal by using the different directional beams, so that a power of transmitting the reference signal can reach a maximum value in a direction directed by the transmit beam. The receive end may also form different directional beams in space through beamforming, and may perform polling on a plurality of different directional beams, to receive the reference signal by using the different directional beams, so that a power of receiving the reference signal by the receive end can reach a maximum value in a direction directed by the receive beam.

All transmit beams and receive beams are traversed, so that the receive end can perform channel measurement based on the received reference signal, and report a measurement result to the transmit end by using CSI. For example, the receive end may report, to the transmit end, some reference signal resources with relatively high reference signal received powers (RSRPs), for example, report identifiers of the reference signal resources, so that the transmit end receives and sends a signal by using a beam pairing link with relatively good channel quality during data or signaling transmission.

3. Reference signal and reference signal resource: The reference signal may be used for channel measurement, channel estimation, or the like. The reference signal resource may be used to configure a transmission attribute of the reference signal, for example, a time-frequency resource location, a port mapping relationship, a power factor, and a scrambling code. For details, refer to the conventional technology. A transmit end device may send a reference signal based on a reference signal resource, and a receive end device may receive a reference signal based on a reference signal resource.

The channel measurement in this application also includes beam measurement. To be specific, beam quality information is obtained by measuring a reference signal. A parameter used to measure beam quality includes an RSRP, but is not limited thereto. For example, the beam quality may alternatively be measured by using parameters such as reference signal received quality (RSRQ), a signal-to-noise ratio (SNR), a signal to interference plus noise ratio (SINR), and a channel quality indicator (CQI). In the embodiments of this application, for ease of description, unless otherwise specified, the channel measurement may be considered as the beam measurement.

The reference signal may include, for example, a channel state information reference signal (CSI-RS), a synchronization signal block (SSB), and a sounding reference signal (SRS). Correspondingly, the reference signal resource may include a CSI-RS resource, an SSB resource, or an SRS resource.

It should be noted that the SSB may also be referred to as a synchronization signal/physical broadcast channel block (SS/PBCH block), and the corresponding SSB resource may also be referred to as a synchronization signal/physical broadcast channel block resource (SS/PBCH block resource)

To distinguish between different reference signal resources, each reference signal resource may correspond to one reference signal resource identifier, for example, a CSI-RS resource indicator (CRI), an SSB resource identifier (SSBRI), or an SRS resource index (SRI).

The SSB resource identifier may also be referred to as an SSB index.

It should be understood that the reference signals and the corresponding reference signal resources enumerated above are merely examples for description, and shall not constitute any limitation on this application. This application does not exclude a possibility that another reference signal is defined in a future protocol to implement a same or similar function.

4. Antenna port: The antenna port is briefly referred to as a port. The antenna port corresponds to one or more transmit antenna identified by a receive end device or one or more transmit antenna that can be identified in space. One antenna port may be configured for each virtual antenna, each virtual antenna may be a weighted combination of a plurality of physical antennas, and each antenna port may correspond to one reference signal port.

5. Quasi-colocation (QCL): The quasi-colocation is also referred to as quasi-colocation. Signals corresponding to antenna ports that have a QCL relationship have a same parameter, or a parameter of one antenna port may be used to determine a parameter of another antenna port that has a QCL relationship with the antenna port, or two antenna ports have a same parameter, or a parameter difference between two antenna ports is less than a threshold. The parameter may include one or more of the following: a delay spread, a Doppler spread, a Doppler shift, an average delay, an average gain, and a spatial reception parameter (spatial Rx parameters). The spatial reception parameter may include one or more of the following: an angle of arrival (AOA), an average AOA, an AOA spread, an angle of departure (AOD), an average angle of departure AOD, an AOD spread, a receive antenna spatial relation parameter, a transmit antenna spatial relation parameter, a transmit beam, a receive beam, and a resource identifier.

The foregoing angles may be decomposition values at different dimensions or a combination of decomposition values at different dimensions. The antenna ports are antenna ports having different antenna port numbers, antenna ports that have a same antenna port number and that are used to send or receive information at different times, at different frequencies, and/or on different code domain resources, and/or antenna ports that have different antenna port numbers and that are used to send or receive information at different times, at different frequencies, and/or on different code domain resources. The resource identifier may include a CSI-RS resource identifier, an SRS resource identifier, an SSB resource identifier, a resource identifier of a preamble sequence transmitted on a physical random access channel (PRACH), or a resource identifier of a demodulation reference signal (DMRS), and indicates a beam on a resource.

In an NR protocol, the QCL relationship may be classified into the following four types based on different parameters:
type A: the Doppler shift, the Doppler spread, the average delay, and the delay spread;
type B: the Doppler shift and the Doppler spread;
type C: the Doppler shift and the average delay; and
type D: the spatial reception parameter.

When the QCL relationship is a QCL relationship of the type D, the QCL relationship may be considered as spatial QCL. When the antenna ports satisfy the spatial QCL relationship, a QCL relationship between ports for downlink signals or between ports for uplink signals may mean that the two signals have a same AOA or AOD, and indicates that the two signals have a same receive beam or transmit beam. For another example, a QCL relationship between a downlink signal and an uplink signal or between a port for an uplink signal and a port for a downlink signal may mean that there are a correspondence between AOAs of the two signals and a correspondence between AODs of the two signals, or that there are a correspondence between AODs of the two signals and a correspondence between AOAs of the two signals. To be specific, beam reciprocity may be used to determine an uplink transmit beam based on a downlink receive beam or determine a downlink receive beam based on an uplink transmit beam.

From a perspective of the transmit end, if two antenna ports are of spatial QCL, it may indicate that beam directions corresponding to the two antenna ports are consistent in space. From a perspective of the receive end, if two antenna ports are of spatial QCL, it may indicate that the receive side can receive, in a same beam direction, signals sent through the two antenna ports.

Signals transmitted through ports having a spatial QCL relationship may further have a corresponding beam. The corresponding beam includes at least one of the following: a same receive beam, a same transmit beam, a transmit beam corresponding to a receive beam (corresponding to a reciprocity scenario), and a receive beam corresponding to a transmit beam (corresponding to a reciprocity scenario).

Signals transmitted through ports having a spatial QCL relationship may alternatively be understood as signals received or sent by using a same spatial filter. The spatial filter may be at least one of the following: precoding, a weight of an antenna port, a phase deflection of the antenna port, and an amplitude gain of the antenna port.

Signals transmitted through ports having a spatial QCL relationship may alternatively be understood as having a corresponding beam pair link (BPL). The corresponding BPL includes at least one of the following: a same downlink BPL, a same uplink BPL, an uplink BPL corresponding to a downlink BPL, and a downlink BPL corresponding to an uplink BPL.

Therefore, the spatial reception parameter (namely, the QCL of the type D) may be understood as a parameter used to indicate direction information of a receive beam.

6. Transmission configuration indicator (TCI) state: The TCI state may be used to indicate a QCL relationship between two types of reference signals. Each TCI state may include a serving cell index (ServeCellIndex), a bandwidth part (BWP) identifier (ID), and a reference signal resource identifier. The reference signal resource identifier may be, for example, at least one of the following: a non-zero power (NZP) CSI-RS reference signal resource identifier (NZP-CSI-RS-ResourceId), a non-zero power CSI-RS reference signal resource set identifier (NZP-CSI-RS-ResourceSetId), an SSB index (SSB-Index), a tracking reference signal (TRS) index, or a phase tracking reference signal (PTRS) index.

The serving cell index, the BWP ID, and the reference signal resource identifier indicate a reference signal resource used in a beam training process, and a serving cell and a BWP that correspond to the reference signal resource. In the beam training process, a network device sends reference signals by using different transmit beams based on different reference signal resources, and therefore the reference signals sent by using the different transmit beams may be associated with the different reference signal resources; and a terminal device receives reference signals by using different receive beams based on different reference signal resources, and therefore the reference signals received by using the different receive beams may also be associated with the different reference signal resources. Therefore, in the beam training process, the terminal device may maintain a correspondence between the serving cell index, the BWP ID, the reference signal resource identifier, and the receive beam, and the network device may maintain a correspondence between the serving cell index, the BWP ID, the reference signal resource identifier, and the transmit beam. A pairing relationship between the receive beam and the transmit beam may be established by using the reference signal resource identifier.

In a subsequent communication process, the terminal device may determine the receive beam based on a TCI state indicated by the network device, and the network device may determine the transmit beam based on the same TCI state.

In addition, the TCI state may be globally configured. In TCI states configured for different cells and different BWPs, if indexes of the TCI states are the same, configurations corresponding to the TCI states are also the same. For example, configurations corresponding to TCI states 0 in Table 1 and Table 2 shown below may be the same.

7. TCI: The TCI may be used to indicate a TCI state.

In an implementation, a network device may configure a TCI state list for a terminal device by using higher layer signaling (for example, first RRC signaling), where the TCI state list includes candidate TCI states used to receive a PDSCH. For example, the network device may configure the TCI state list for the terminal device by using a TCI state to add mode list (tci-States To AddModList) in an RRC message. The TCI state list may include a plurality of TCI states. For example, the network device may configure a maximum of 128 candidate TCI states for each BWP in each cell, and the maximum of 128 candidate TCI states are candidate beams used to receive the PDSCH.

Subsequently, in an optional implementation, the network device may activate, by using higher layer signaling (for example, first MAC CE signaling), one or more TCI states in the candidate TCI states of the PDSCH to receive the PDSCH. The activated TCI state is a subset of the TCI state list configured by using the RRC signaling (namely, the first RRC signaling). For example, the network device may activate a maximum of 8 TCI states for each BWP in each cell. Optionally, the one or more TCI states are mapped to codepoints in a TCI field in DCI.

In an optional implementation, a network device may configure a TCI state list for a terminal device by using higher layer signaling (for example, second RRC signaling), where the TCI state list includes (candidate) TCI states used to receive a PDCCH. The second RRC signaling indicates that one or more TCI states in the TCI state list of the PDCCH are used to receive the PDCCH. The one or more TCI states indicated by the second RRC signaling are a subset of the TCI state list configured by using the first RRC signaling. For example, the network device may indicate a maximum of 64 TCI states for each BWP in each cell. Optionally, the TCI state is used to receive the PDCCH.

In an optional implementation, the network device may indicate, by using higher layer signaling (for example, second MAC CE signaling), one or more TCI states in the TCI state list of the PDCCH to receive the PDCCH. The one or more TCI states indicated by the second MAC CE signaling are a subset of the TCI state list configured by using the second RRC signaling.

The following describes the embodiments of this application in detail with reference to the accompanying drawings.

It should be understood that terms "first", "second", and various sequence numbers in the following embodiments are merely used for differentiation for ease of description, for example, distinguishing between different reference signal resources, but are not intended to limit the scope of the embodiments of this application.

It should be further understood that in the following embodiments, "pre-obtaining" may include being signaled or predefined by a network device, for example, defined in a protocol. The "predefinition" may be implemented in a manner in which corresponding code, a table, or other related indication information may be prestored in a device (for example, including a terminal device and a network device). A specific implementation of the "predefinition" is not limited in this application.

It should be further understood that "store" in the embodiments of this application may mean that the code, the table, or the information is stored in one or more memories. The one or more memories may be separately disposed, or may be integrated into an encoder or a decoder, a processor, or a communications apparatus. Alternatively, a part of the one or more memories may be separately disposed, or a part of the one or more memories may be integrated into a decoder, a processor, or a communications apparatus. A type of the memory may be a storage medium in any form. This is not limited in this application.

It should be further understood that the "protocol" in the embodiments of this application may be a standard protocol in the communications field, and for example, may include an LTE protocol, an NR protocol, and a related protocol used in a future communications system. This is not limited in this application.

The technical solutions in this application may be used in a wireless communications system, for example, the communications system 100 shown in FIG. 1. There may be a wireless communication connection relationship between two communications apparatuses located in the wireless communications system. For example, one of the two communications apparatuses may correspond to the network device 110 shown in FIG. 1, for example, may be the network device 110 or a chip disposed in the network device 110. For example, the other one of the two communications apparatuses may correspond to the terminal device 130 in FIG. 1, for example, may be the terminal device 130 or a chip disposed in the terminal device 130. For another example, one of the two communications apparatuses may correspond to the network device 120 shown in FIG. 1, for example, may be the network device 120 or a chip disposed in the network device 120. For another example, the other one of the two communications apparatuses may correspond to the terminal device 130 in FIG. 1, for example, may be the terminal device 130 or a chip disposed in the terminal device 130.

Without loss of generality, the following first describes the embodiments of this application in detail by using a downlink transmission process between a terminal device and a network device as an example. It may be understood that any terminal device in the wireless communications system or a chip disposed in the terminal device may receive a downlink signal according to a same method. This is not limited in this application.

Figure 2:
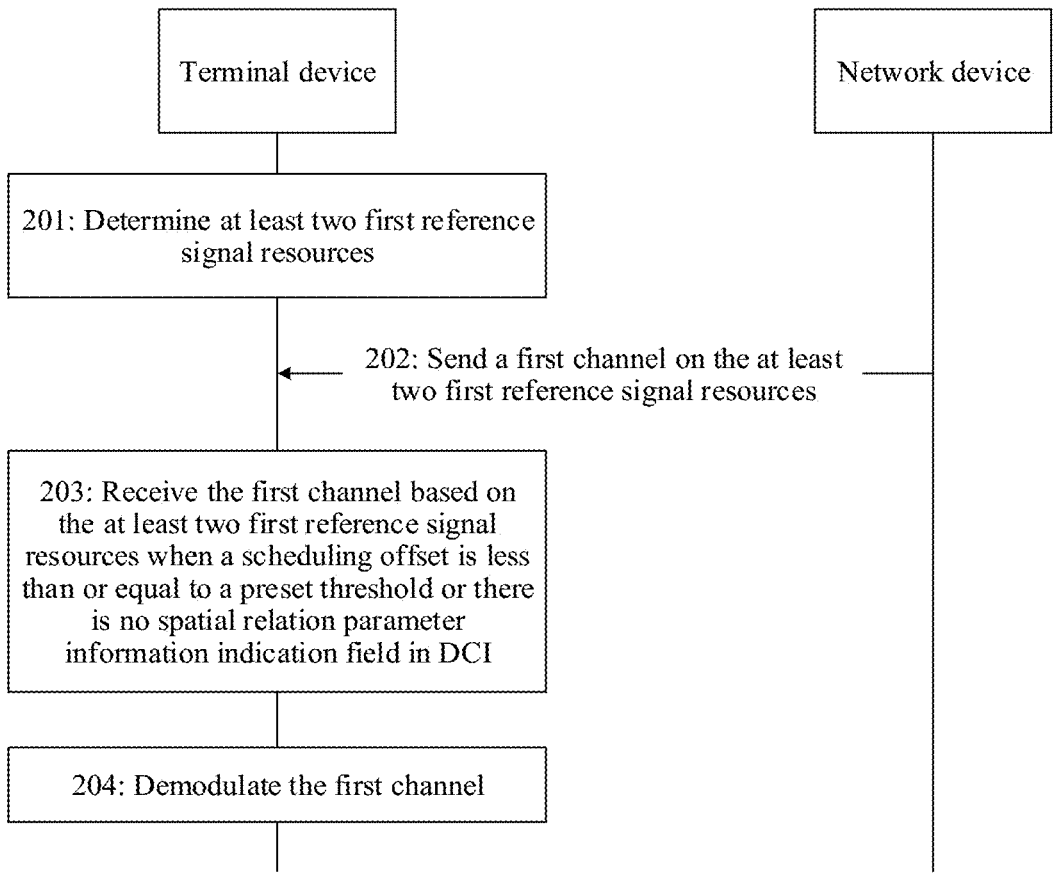
FIG. 2 is a schematic flowchart of a signal transmission method according to an embodiment of this application.

FIG. 2 is a schematic flowchart of a signal transmission method 200 shown from a perspective of device interaction. As shown in the figure, the method 200 shown in FIG. 2 may include step 201 to step 203. The following describes the steps in the method 200 in detail with reference to FIG. 2.

Step 201: A terminal device determines at least two first reference signal resources.

Specifically, the terminal device determines at least two reference signal resources (for example, at least two first reference signal resources). The at least two first reference signal resources may be used by the terminal device to receive a physical downlink shared channel (PDSCH) delivered by a network device.

In an implementation, the at least two first reference signal resources may be reference signal resources that are last reported by the terminal device, and at least two reference signals carried on the at least two first reference signal resources are reference signals that can be simultaneously received.

It should be understood that in this embodiment of this application, simultaneous receiving means receiving at a same moment, receiving at an overlapping moment, receiving in a same time unit, or receiving in at least one overlapping time unit, and M reference signals overlap in at least one time unit. The time unit may be one or more radio frames, one or more subframes, one or more slots, one or more mini slots, or one or more orthogonal frequency division multiplexing (OFDM) symbols defined in an LTE system or a 5G NR system, or may be a time window including a plurality of frames or subframes, for example, a system information (SI) window. The following embodiment is described by using an example in which the reference signals that are simultaneously received are reference signals received on one or more OFDM symbols. This is not limited in this application.

Specifically, the at least two first reference signal resources may be reference signal resources that are last reported by the terminal device in one packet, and reference signals carried on the reference signal resources reported in one packet are reference signals that can be simultaneously received.

In another implementation, the at least two first reference signal resources may be determined by the terminal device based on spatial relation parameter information (for example, first spatial relation parameter information), and the first spatial relation parameter information may indicate at least two reference signal resources, and may further indicate a type that is of a spatial relation parameter and that is associated with the at least two reference signal resources.

Specifically, the terminal device obtains the first spatial relation parameter information, where the first spatial relation parameter information indicates the at least two reference signal resources, and further indicates the type that is of the spatial relation parameter and that is associated with the at least two reference signal resources.

For example, the first spatial relation parameter information indicates at least two channel state information reference signal (CSI-RS) resources, and the first spatial relation parameter information further indicates a type that is of a spatial relation parameter and that is associated with the at least two CSI-RS resources. For example, when the type that is of the spatial relation parameter, that is associated with the at least two CSI-RS resources, and that is included in the first spatial relation parameter information is a quasi-colocation (QCL) type D, the terminal device determines the at least two CSI-RS resources as the at least two first reference signal resources.

As an example instead of a limitation, the terminal device may receive, by using radio resource control (RRC) signaling or media access control (MAC) control element (CE) signaling, configuration information sent by the network device, and obtain the first spatial relation parameter information based on the configuration information, where the configuration information indicates the first spatial relation parameter information. Correspondingly, the network device may send the configuration information to the terminal device by using the RRC signaling or the MAC CE signaling. As an example instead of a limitation, before sending the configuration information, the network device may obtain the configuration information.

Specifically, the terminal device receives the configuration information sent by the network device, where the configuration information can indicate the first spatial relation parameter information.

For example, the configuration information may include one or at least two transmission configuration indicator state (TCI-state) IDs, a TCI state indicated by a TCI state ID may include an identifier of at least one reference signal resource and a type that is of a spatial relation parameter and that is associated with the at least one reference signal resource, and the identifier may be an index value of the reference signal resource. When the configuration information includes one TCI state ID, a TCI state indicated by the TCI state ID may include index values of at least two reference signal resources and a type that is of a spatial relation parameter and that is associated with the at least two reference signal resources. When the configuration information includes at least two TCI state IDs, a TCI state indicated by each TCI state ID may include an identifier of at least one reference signal resource and a type that is of a spatial relation parameter and that is associated with the at least one reference signal resource. This is not limited in this application.

The terminal device may obtain the first spatial relation parameter information based on the configuration information. For example, the configuration information includes two TCI state IDs, and values of the two TCI state IDs are 001 and 111. A TCI state indicated by the TCI state ID whose value is 001 includes an identifier of at least one CSI-RS resource, and includes a QCL type that is of a spatial relation parameter and that is associated with the CSI-RS resource, and a TCI state indicated by the TCI state ID whose value is 111 includes an identifier of at least one CSI-RS resource, and includes a QCL type that is of a spatial relation parameter and that is associated with the CSI-RS resource.

For example, the index value that is of the CSI-RS resource and that is included in the TCI state indicated by the TCI state ID whose value is 001 is #1, and the type that is of the spatial relation parameter, that is associated with the CSI-RS resource, and that is included in the TCI state is a QCL type D; and the index value that is of the CSI-RS resource and that is included in the TCI state indicated by the TCI state ID whose value is 111 is #3, and the type that is of the spatial relation parameter, that is associated with the CSI-RS resource, and that is included in the TCI state is a QCL type D. The first spatial relation parameter information obtained by the terminal device based on the configuration information includes two reference signal resources whose index values are #1 and #3, and includes a QCL type D that is of a spatial relation parameter and that is associated with the reference signal resource whose index value is #1 and a QCL type D that is of a spatial relation parameter and that is associated with the reference signal resource whose index value is #3.

For example, the configuration information includes one TCI state ID, a value of the TCI state ID is 010, and a TCI state indicated by the TCI state ID includes identifiers of at least two CSI-RS resources, and includes a QCL type that is of a spatial relation parameter and that is associated with the at least two CSI-RS resources.

For example, index values that are of CSI-RS resources and that are included in the TCI state indicated by the TCI state ID are #4 and #6, and a type that is of a spatial relation parameter, that is associated with the CSI-RS resources whose index values are #4 and #6, and that is included in the TCI state is a QCL type D. The first spatial relation parameter information obtained by the terminal device based on the configuration information includes two reference signal resources whose index values are #4 and #6, and includes a QCL type D that is of a spatial relation parameter and that is associated with the reference signal resource whose index value is #4 and a QCL type D that is of a spatial relation parameter and that is associated with the reference signal resource whose index value is #6.

It should be noted that the TCI states indicated by the configuration information may be some TCI states in the TCI state list of the PDSCH, some TCI states in the TCI state list of the PDCCH, or some TCI states in the activated TCI states of the PDSCH mentioned above.

In other words, it should be noted that there are a plurality of methods for obtaining the TCI state IDs. The TCI state IDs may indicate some TCI states in the TCI state list of the PDCCH, or the TCI state IDs may indicate some TCI states in the activated TCI states of the PDSCH.

It should be further noted that the configuration information may be generated by the network device, or the configuration information may be obtained by the network device from another network element or module. This is not specifically limited in this application.

Step 203: Receive a first channel based on the at least two first reference signal resources when a scheduling offset is less than or equal to a preset threshold or there is no spatial relation parameter information indication field in downlink control information DCI. Correspondingly, the method 200 further includes step 202: The network device sends the first channel based on the at least two first reference signal resources.

Specifically, in downlink transmission, when the scheduling offset is less than or equal to the preset threshold, or when there is no spatial relation parameter information indication field in the downlink control information (DCI), in other words, when there is no indication field that can indicate spatial relation parameter information in the DCI, the terminal device needs to receive, on the at least two first reference signal resources determined in step 201, a PDSCH (for example, the first channel) delivered by the network device. The indication field that can indicate the spatial relation parameter information may be a transmission configuration indicator state (TCI-state) indicator field.

It should be noted that the scheduling offset is an offset between a receiving moment of DCI for scheduling the first channel and a receiving moment of the first channel. For example, the receiving moment of the DCI for scheduling the first channel is n+k, and the receiving moment of the first channel is n. In this case, the offset between the receiving moment of the DCI for scheduling the first channel and the receiving moment of the first channel is k.

It should be further noted that whether there is a spatial relation parameter information indication field in the DCI may be predetermined according to a protocol specification, or may be notified by the network device to the terminal device in advance. This is not limited in this application.

Step 204: Demodulate the first channel.

Specifically, in step 203, the terminal device receives the first channel. In step 204, the terminal device may demodulate the received first channel, to obtain the demodulated first channel.

Usually, there may be two types of data carried on the first channel, for example, data #1 and data #2. The two types of data may be simultaneously sent and scheduled by using one piece of DCI, may be simultaneously sent and scheduled by using a plurality of pieces of DCI, may be sent at different times and separately scheduled by using a plurality of pieces of DCI, may be sent at different times and scheduled by using DCI at different moments, may be simultaneously sent by using different transmit beams (or spatial relation parameters), or may be sent at different times and scheduled by using one piece of DCI. Optionally, the two types of data may be from different TRPs or a same TRP.

Optionally, the data #1 may be a codeword #1, and the data #2 may be a codeword #2. Alternatively, the data #1 may be data from a layer 1 to a layer X, and the data #2 may be data from a layer X+1 to a layer Y. Herein, X is an integer greater than or equal to 1, and Y is an integer greater than or equal to X+1. Alternatively, the data #1 and the data 2 may be two pieces of time division multiplexing (TDM) data scheduled by using the DCI, or the data #1 and the data 2 may be two pieces of frequency division multiplexing (FDM) data scheduled by using the DCI.

Optionally, the data #1 may be scheduled by using DCI #1 at a first moment, and the data #2 may be scheduled by using DCI #2 at a second moment. Optionally, the data #1 may be scheduled by using DCI #1 in a first format, and the data #2 may be scheduled by using DCI #2 in a second format. Optionally, the data #1 may be scheduled by using DCI #1 in a first search space set and/or a first control resource set, and the data #2 may be scheduled by using DCI #2 in a second search space set and/or a second control resource set. Optionally, the data #1 may be sent by using a first beam (based on a spatial relation parameter of a reference signal 1), and the data #2 may be sent by using a second beam (based on a spatial relation parameter of a reference signal 2).

When demodulating the first channel, the terminal device may determine, from at least two reference signal resources used for demodulation, target reference signal resources used to demodulate the data #1 and the data #2. For example, the terminal device determines one of the two reference signal resources as a target reference signal resource used to demodulate the data #1, and the terminal device determines the other one of the two reference signal resources as a target reference signal resource used to demodulate the data #2. A method for the terminal device to determine a target reference signal resource used to demodulate the data #1 and the data #2 and a method for the terminal device to demodulate the first channel based on the target reference signal resource are to be described in detail below.

Optionally, when determining the target reference signal resource, the terminal device may determine, based on association information, at least one reference signal resource that has an association relationship with a first information as the target reference signal resource, where the association relationship indicates an association relationship between a plurality of reference signal resources and a plurality of pieces of second information, the second information includes at least one of the following information: an index number of an antenna port, an index number of a code division multiplexing antenna port group to which the antenna port belongs, an index number of a control resource set (CORSET) to which a resource carrying DCI belongs, and an index number of a search space set to which the resource carrying the DCI belongs, and the first information is one of the plurality of pieces of second information.

Optionally, the first information includes at least one of the following: an index number of a CORESET in which the DCI for scheduling the first channel is located, an index number of a search space set in which the DCI for scheduling the first channel is located, an antenna port field carried in the DCI for scheduling the first channel, a transport block field carried in the DCI for scheduling the first channel, a specific field in the DCI, a format of the DCI, or scrambling information of the DCI (for example, the DCI is scrambled by using different cell IDs), and a transmission configuration indicator field (TCI field) carried in the DCI for scheduling the first channel. It should be noted that the specific field in the DCI may be a reserved field in the DCI, or the specific field in the DCI may be a field that is newly added to the DCI and that is dedicated to determining the target reference signal resource. This is not specifically limited in this application.

Optionally, the at least two reference signal resources may be the at least two first reference signal resources obtained in step 201, or the at least two reference signal resources may be at least two second reference signal resources obtained by the terminal device.

The following describes a method for the terminal device to obtain the at least two second reference signal resources.

As an example instead of a limitation, the at least two second reference signal resources may be obtained by the terminal device based on spatial relation parameter information (for example, second spatial relation parameter information), and the second spatial relation parameter information may indicate at least two reference signal resources, and may further indicate a type that is of a spatial relation parameter and that is associated with the at least two reference signal resources.

Specifically, the terminal device obtains the second spatial relation parameter information, where the second spatial relation parameter information indicates the at least two reference signal resources (for example, the at least two second reference signal resources), and further indicates the type that is of the spatial relation parameter and that is associated with the at least two second reference signal resources.

For example, the second spatial relation parameter information indicates at least two CSI-RS resources, and the second spatial relation parameter information further indicates a type that is of a spatial relation parameter and that is associated with the at least two CSI-RS resources. For example, the type that is of the spatial relation parameter, that is associated with the at least two CSI-RS resources, and that is included in the second spatial relation parameter information is at least one of a QCL type A, a QCL type B, and a QCL type C.

As an example instead of a limitation, the terminal device may receive, by using RRC signaling or MAC CE signaling, configuration information sent by a network device, and obtain the second spatial relation parameter information based on the configuration information, where the configuration information indicates the second spatial relation parameter information. Correspondingly, the network device may send the configuration information to the terminal device by using the RRC signaling or the MAC CE signaling.

Specifically, the terminal device receives the configuration information sent by the network device, where the configuration information can indicate the second spatial relation parameter information.

For example, the configuration information may include one or at least two TCI state IDs, a TCI state indicated by a TCI state ID may include an identifier of at least one reference signal resource and a type that is of a spatial relation parameter and that is associated with the at least one reference signal resource, and the identifier may be an index value of the reference signal resource. When the configuration information includes one TCI state ID, a TCI state indicated by the TCI state ID may include index values of at least two reference signal resources and a type that is of a spatial relation parameter and that is associated with the at least two reference signal resources. When the configuration information includes at least two TCI state IDs, a TCI state indicated by each TCI state ID may include an identifier of at least one reference signal resource and a type that is of a spatial relation parameter and that is associated with the at least one reference signal resource. This is not limited in this application.

The terminal device may obtain the second spatial relation parameter information based on the configuration information. For example, the configuration information includes two TCI state IDs, and values of the two TCI state IDs are 001 and 111. A TCI state indicated by the TCI state ID whose value is 001 includes an identifier of at least one CSI-RS resource, and includes a QCL type that is of a spatial relation parameter and that is associated with the CSI-RS resource, and a TCI state indicated by the TCI state ID whose value is 111 includes an identifier of at least one CSI-RS resource, and includes a QCL type that is of a spatial relation parameter and that is associated with the CSI-RS resource.

For example, the index value that is of the CSI-RS resource and that is included in the TCI state indicated by the TCI state ID whose value is 001 is #1, and the type that is of the spatial relation parameter, that is associated with the CSI-RS resource, and that is included in the TCI state is a QCL type A; and the index value that is of the CSI-RS resource and that is included in the TCI state indicated by the TCI state ID whose value is 111 is #3, and the type that is of the spatial relation parameter, that is associated with the CSI-RS resource, and that is included in the TCI state is a QCL type A. The first spatial relation parameter information obtained by the terminal device based on the configuration information includes two reference signal resources whose index values are #1 and #3, and includes a QCL type A that is of a spatial relation parameter and that is associated with the reference signal resource whose index value is #1 and a QCL type A that is of a spatial relation parameter and that is associated with the reference signal resource whose index value is #3.

It should be noted that only an example in which the QCL type that is of the spatial relation parameter and that is associated with the reference signal resource whose index value is #1 is the same as the QCL type that is of the spatial relation parameter and that is associated with the reference signal resource whose index value is #3 (for example, the QCL types each are the QCL type A) is used for description. However, this application is not limited thereto. For example, the QCL type that is of the spatial relation parameter and that is associated with the reference signal resource whose index value is #1 may be a QCL type A, and the QCL type of the spatial relation parameter and that is associated with the reference signal resource whose index value is #3 may be a QCL type B.

For example, the configuration information includes one TCI state ID, a value of the TCI state ID is 010, and a TCI state indicated by the TCI state ID includes identifiers of at least two CSI-RS resources, and includes a QCL type that is of a spatial relation parameter and that is associated with the at least two CSI-RS resources.

For example, index values that are of CSI-RS resources and that are included in the TCI state indicated by the TCI state ID are #4 and #6, and a type that is of a spatial relation parameter, that is associated with the CSI-RS resources whose index values are #4 and #6, and that is included in the TCI state is a QCL type C. The first spatial relation parameter information obtained by the terminal device based on the configuration information includes two reference signal resources whose index values are #4 and #6, and includes a QCL type C that is of a spatial relation parameter and that is associated with the reference signal resource whose index value is #4 and a QCL type C that is of a spatial relation parameter and that is associated with the reference signal resource whose index value is #6.

It should be noted that in this application, when one TCI state indicates the first spatial relation parameter information or the second spatial relation parameter information, if the TCI state includes at least two reference signal resources, and the at least two reference signal resources are associated with a same type of a spatial relation parameter, the TCI state may include only one QCL type. For example, when the TCI state includes index values of at least two CSI-RS resources, and the at least two CSI-RS resources are associated with a same QCL type C of a spatial relation parameter, the TCI state may include only the QCL type C.

It should be further noted that in this application, the first spatial relation parameter information and the second spatial relation parameter information may be indicated by using a same TCI state or two same TCI states. For example, one TCI state may include the at least two first reference signal resources and the at least two second reference signal resources, a type that is of a spatial relation parameter and that is associated with the at least two first reference signal resources may be a QCL type D, and a type that is of a spatial relation parameter and that is associated with the at least two second reference signal resources may be any one of a QCL type A, a QCL type B, and a QCL type C. For another example, one TCI state may include at least one of the at least two first reference signal resources and at least one of the at least two second reference signal resources, a type that is of a spatial relation parameter and that is associated with the at least one first reference signal resource may be a QCL type D, and a type that is of a spatial relation parameter and that is associated with the at least one second reference signal resource may be any one of a QCL type A, a QCL type B, and a QCL type C. The other TCI state includes at least one other first reference signal resource in the at least two first reference signal resources and at least one other second reference signal resource in the at least two second reference signal resources, a type that is of a spatial relation parameter and that is associated with the at least one other first reference signal resource may be a QCL type D, and a type that is of a spatial relation parameter and that is associated with the at least one other second reference signal resource may be any one of a QCL type A, a QCL type B, and a QCL type C.

It should be further noted that in this application, the type that is of the spatial relation parameter and that is associated with the first reference signal resource may further include at least one of a QCL type A, a QCL type B, and a QCL type C, and the type that is of the spatial relation parameter and that is associated with the second reference signal resource may further include a QCL type D. This is not limited in this application.

The technical solutions in this application may be applied to a non-coherent joint transmission (NC-JT) scenario, a coordinated multipoint transmission/reception (CoMP) scenario, or a dynamic point selection (DPS) scenario. For different scenarios, the following describes in detail a method for the terminal device to demodulate the first channel.

It should be noted that a plurality of transmission and reception points (TRP) in the following descriptions may be one or more network devices. This is not limited in this application.

Scenario 1: In this scenario, namely, the NC-JT scenario or the CoMP scenario (the first channel is scheduled by using one piece of DCI), data carried on the first channel is from a plurality of network devices (namely, TRPs), and the first channel is scheduled by using one piece of DCI.

For example, the data carried on the first channel includes two parts: data #1 and data #2. Optionally, the data #1 may be a codeword #1, and the data #2 may be a codeword #2. Optionally, the data #1 may be data from a layer 1 to a layer X, and the data #2 may be data from a layer X+1 to a layer Y. Herein, X is an integer greater than or equal to 1, and Y is an integer greater than or equal to X+1. The data #1 and the data #2 may be simultaneously sent and scheduled by using one piece of DCI.

For ease of description, the plurality of TRPs in the NC-JT scenario or the CoMP scenario are denoted as a TRP #1 to a TRP n, where n is an integer greater than or equal to 2. Descriptions are provided below by using an example in which n is equal to 2.

Specifically, for example, the data carried on the first channel may include the codeword #1 and the codeword #2. The codeword 1 is sent by the TRP #1, and the codeword 2 is sent by the TRP #2. The TRP #1 and the TRP #2 may determine, through negotiation, that DCI is delivered by one of the TRPs or a primary TRP, where the DCI is used to schedule the first channel.

When the terminal device receives, based on the at least two first reference signal resources, the codeword #1 and the codeword #2 carried on the first channel, the terminal device further needs to demodulate the first channel, to obtain the demodulated first channel. The following describes, by using an example in which the terminal device demodulates the first channel based on the target reference signal resource determined from the at least two second reference signal resources, the method for the terminal device to demodulate the first channel.

After obtaining the second spatial relation parameter information, the terminal device may determine the target reference signal resource from the at least two second reference signal resources included in the second spatial relation parameter information, and demodulate the first channel based on the target reference signal resource.

In an implementation, when demodulating the first channel, the terminal device may determine at least one reference signal resource from the at least two second reference signal resources as the target reference signal resource based on the first information, where the first information is information about DCI for scheduling the first channel; and demodulate the first channel based on the target reference signal resource.

As an example instead of a limitation, the first information includes at least one of the following: an index number of a control resource set (CORSET) in which the DCI for scheduling the first channel is located, an index number of a search space set in which the DCI for scheduling the first channel is located, an antenna port field carried in the DCI for scheduling the first channel, and a transport block field carried in the DCI for scheduling the first channel, a specific field in the DCI, a format of the DCI, or scrambling information of the DCI (for example, the DCI is scrambled by using different cell IDs). It should be noted that the specific field in the DCI may be a reserved field in the DCI, or the specific field in the DCI may be a field that is newly added to the DCI and that is dedicated to determining the target reference signal resource. This is not specifically limited in this application.

For example, a value in the antenna port (for example, a demodulation reference signal (DMRS) port) field carried in the DCI received by the terminal device is 0, and a value in the transport block field carried in the DCI received by the terminal device indicates that a quantity of transmitted codewords is 2. In this case, DMRS ports indicated by the value 0 in the DMRS port field include a DMRS port #0 to a DMRS port #4.

When determining the target reference signal resource for demodulating the first channel, the terminal device may map a DMRS port with a smaller index value to a second reference signal resource with a smaller index value, and map a DMRS port with a larger index value to a second reference signal resource with a larger index value. For example, the terminal device determines a second reference signal resource whose index value is #1 as a target reference signal resource corresponding to the DMRS port #0, determines a second reference signal resource whose index value is #2 as a target reference signal resource used for demodulating the DMRS port #1, determines a second reference signal resource whose index value is #4 as a target reference signal resource used for demodulating the DMRS port #2, determines a second reference signal resource whose index value is #5 as a target reference signal resource used for demodulating the DMRS port #3, and determines a second reference signal resource whose index value is #6 as a target reference signal resource used for demodulating the DMRS port #4, to finally complete demodulation on the first channel.

It should be noted that, that one DMRS port corresponds to one reference signal resource (for example, the second reference signal resource) is merely an example for description. This application is not limited thereto. For example, alternatively, a plurality of DMRS ports may correspond to one reference signal resource. In other words, the plurality of DMRS ports may be demodulated by using one reference signal resource.

For another example, a value in the DMRS port field carried in the DCI received by the terminal device is 2, and a value in the transport block field carried in the DCI received by the terminal device indicates that a quantity of transmitted codewords is 2. In this case, DMRS ports indicated by the value 2 in the DMRS port field include a DMRS port #0 to a DMRS port #6.

Assuming that a value of a DMRS type is 1, a grouping status that is of a code division multiplexing (CDM) group to which DMRS ports belong and that is predefined in a protocol is as follows: DMRS ports included in a CDM group #0 are a DMRS port #0, a DMRS port #1, a DMRS port #4, and a DMRS port #5, and DMRS ports included in a CDM group #1 are a DMRS port #2, a DMRS port #3, a DMRS port #6, and a DMRS port #7.

When determining the target reference signal resource for demodulating the first channel, the terminal device may map a CDM group with a smaller index value to a second reference signal resource with a smaller index value, and map a CDM group with a larger index value to a second reference signal resource with a larger index value. For example, the terminal device maps the CDM group #0 to a second reference signal resource whose index value is #3, that is, determines the second reference signal resource whose index value is #3 as a target reference signal resource used for demodulating the DMRS port #0, the DMRS port #1, the DMRS port #4, and the DMRS port #5; and the terminal device maps the CDM group #1 to a first reference signal resource whose index value is #5, that is, determines the second reference signal resource whose index value is #5 as a target reference signal resource used for demodulating the DMRS port #2, the DMRS port #3, and the DMRS port #6, to finally complete demodulation on the first channel.

Optionally, when determining the target reference signal resource for demodulating the first channel, the terminal device may map a codeword, a control resource set, or a search space set with a smaller index value to a second reference signal resource with a smaller index value, and map a codeword, a control resource set, or a search space set with a larger index value to a second reference signal resource with a larger index value.

Optionally, when determining the target reference signal resource for demodulating the first channel, the terminal device may map a codeword, a control resource set, or a search space set with a smaller index value to a second reference signal resource with a smaller index value in a TCI state, and map a codeword, a control resource set, or a search space set with a larger index value to a second reference signal resource with a larger index value in the TCI state.

Optionally, when determining the target reference signal resource for demodulating the first channel, the terminal device may map a CDM group with a smaller index value to a second reference signal resource with a smaller index value in a TCI state, and map a CDM group with a larger index value to a second reference signal resource with a larger index value in the TCI state.

In addition, when demodulating the first channel, the terminal device may determine, based on an association relationship, at least one reference signal resource that has an association relationship with the first information as the target reference signal resource, where the association relationship indicates an association relationship between a plurality of reference signal resources and a plurality of pieces of second information, the second information includes at least one of the following information: an index number of an antenna port, an index number of a code division multiplexing antenna port group to which the antenna port belongs, an index number of a control resource set CORESET to which a resource carrying DCI belongs, and an index number of a search space set to which the resource carrying the DCI belongs, and the first information is one of the plurality of pieces of second information.

For example, the association relationship indicates the association relationship between the plurality of reference signal resources and the plurality of pieces of second information (for example, index values of CDM groups), and the association relationship indicates that the CDM group #0 corresponds to a reference signal resource whose index value is #4, and the CDM group #1 corresponds to a reference signal resource whose index value is #6.

A value in the DMRS port field carried in the DCI received by the terminal device is 1, and a value in the transport block field carried in the DCI received by the terminal device indicates that a quantity of transmitted codewords is 2. In this case, DMRS ports indicated by the value 1 in the DMRS port field include a DMRS port #0 to a DMRS port #4 and a DMRS port #6.

Assuming that a value of a DMRS type is 1, a grouping status that is of a CDM group to which DMRS ports belong and that is predefined in a protocol is as follows: DMRS ports included in the CDM group #0 are a DMRS port #0, a DMRS port #1, a DMRS port #4, and a DMRS port #5, and DMRS ports included in the CDM group #1 are a DMRS port #2, a DMRS port #3, a DMRS port #6, and a DMRS port #7.

When determining the target reference signal resource for demodulating the first channel, the terminal device may map the CDM group #0 to a second reference signal resource whose index value is #4, that is, determine the second reference signal resource whose index value is #4 as a target reference signal resource used for demodulating the DMRS port #0, the DMRS port #1, and the DMRS port #4; and map the CDM group #1 to a second reference signal resource whose index value is #6, that is, determine the second reference signal resource whose index value is #6 as a target reference signal resource used for demodulating the DMRS port #2, the DMRS port #3, and the DMRS port #6, to finally complete demodulation on the first channel.

In another implementation, when demodulating the first channel, the terminal device may determine at least one reference signal resource from the at least two first reference signal resources as the target reference signal resource based on the first information, where the first information is information about DCI for scheduling the first channel; and demodulate the first channel based on the target reference signal resource.

The terminal device may determine the target reference signal resource from the at least two first reference signal resources, and demodulate the first channel based on the target reference signal resource. For a method for the terminal device to determine the target reference signal resource from the at least two first reference signal resources, refer to the related descriptions in the method for the terminal device to determine the target reference signal resource from the at least two second reference signal resources in Scenario 1. For brevity, details are not described herein again.

Scenario 2: In this scenario, namely, the NC-JT scenario or the CoMP scenario (the first channel is scheduled by using a plurality of pieces of DCI), data carried on the first channel is from a plurality of TRPs, and the first channel is scheduled by using a plurality of pieces of DCI.

Usually, there may be two types of data carried on the first channel, for example, data #1 and data #2. The two types of data may be simultaneously sent and scheduled by using a plurality of pieces of DCI, or may be sent at different times and separately scheduled by using a plurality of pieces of DCI.

Optionally, the data #1 may be a codeword #1, and the data #2 may be a codeword #2. Alternatively, the data #1 may be data from a layer 1 to a layer X, and the data #2 may be data from a layer X+1 to a layer Y. Herein, X is an integer greater than or equal to 1, and Y is an integer greater than or equal to X+1.

Optionally, the data #1 may be scheduled by using DCI #1, and the data #2 may be scheduled by using DCI #2. Optionally, the data #1 may be scheduled by using DCI #1 in a first format, and the data #2 may be scheduled by using DCI #2 in a second format. Optionally, the data #1 may be scheduled by using DCI #1 in a first search space set and/or a first control resource set, and the data #2 may be scheduled by using DCI #2 in a second search space set and/or a second control resource set.

For ease of description, the plurality of TRPs are denoted as a TRP #1 to a TRP n, where n is an integer greater than or equal to 2. Descriptions are provided below by using an example in which n is equal to 2.

Specifically, for example, the data carried on the first channel may include the data #1 and the data #2. The data 1 is sent by the TRP #1 and is scheduled by using the DCI #1 delivered by the TRP #1. The data 2 is sent by the TRP #2, and is scheduled by using the DCI #2 delivered by the TRP #2.

When the terminal device receives, based on at least two first reference signal resources, the codeword #1 and the codeword #2 carried on the first channel, the terminal device further needs to demodulate the first channel, to obtain the demodulated first channel.

In an implementation, that the terminal device demodulates the first channel includes: obtaining second spatial relation parameter information, where the second spatial relation parameter information indicates at least two second reference signal resources and a QCL type associated with the at least two second reference signal resources, and the QCL type associated with the at least two second reference signal resources includes at least one of a QCL type A, a QCL type B, and a QCL type C; determining at least one second reference signal resource from the at least two second reference signal resources as a target reference signal resource; and demodulating the first channel based on the target reference signal resource.

For a method for the terminal device to obtain the second spatial relation information, refer to the related descriptions in Scenario 1. For brevity, details are not described herein again.

Specifically, after obtaining the second spatial relation parameter information, the terminal device may determine the target reference signal resource from the at least two second reference signal resources included in the second spatial relation parameter information, and demodulate the first channel based on the target reference signal resource.

In an implementation, when demodulating the first channel, the terminal device may determine at least one reference signal resource from the at least two second reference signal resources as the target reference signal resource based on the first information, where the first information is information about DCI for scheduling the first channel; and demodulate the first channel based on the target reference signal resource.

As an example instead of a limitation, the first information includes at least one of the following: an index number of a control resource set in which the DCI for scheduling the first channel is located, an index number of a search space set in which the DCI for scheduling the first channel is located, an antenna port field carried in the DCI for scheduling the first channel, and a transport block field carried in the DCI for scheduling the first channel, a specific field in the DCI, a format of the DCI, or scrambling information of the DCI (for example, the DCI is scrambled by using different cell IDs). It should be noted that the specific field in the DCI may be a reserved field in the DCI, or the specific field in the DCI may be a field that is newly added to the DCI and that is dedicated to determining the target reference signal resource. This is not specifically limited in this application.

In Scenario 2, the terminal device receives a plurality of pieces of data and a plurality of pieces of DCI, where the plurality of pieces of DCI and the plurality of pieces of data each are from a plurality of TRPs. As described above, the terminal device receives the data #1 and the data #2, and the DCI #1 and the DCI #2, where the data #1 and the DCI #1 are from the TRP #1, and the data #2 and the DCI #2 are from the TRP #2.

For example, a value in a DMRS port field carried in the DCI #1 received by the terminal device is 0. It is assumed that DMRS ports indicated by the value 0 in the DMRS port field include a DMRS port #0 and a DMRS port #1. A value in a DMRS port field carried in the DCI #2 received by the terminal device is 1. It is assumed that DMRS ports indicated by the value 1 in the DMRS port field include a DMRS port #6 and a DMRS port #7.

Assuming that a value of a DMRS type is 1, a grouping status that is of a CDM group to which DMRS ports belong and that is predefined in a protocol is as follows: DMRS ports included in a CDM group #0 are a DMRS port #0, a DMRS port #1, a DMRS port #4, and a DMRS port #5, and DMRS ports included in a CDM group #1 are a DMRS port #2, a DMRS port #3, a DMRS port #6, and a DMRS port #7.

When determining the target reference signal resource for demodulating the first channel, the terminal device may map a CDM group with a smaller index value to a second reference signal resource with a smaller index value, and map a CDM group with a larger index value to a second reference signal resource with a larger index value. For example, the terminal device maps the CDM group #0 to a second reference signal resource whose index value is #3, that is, determines the second reference signal resource whose index value is #3 as a target reference signal resource used for demodulating the DMRS port #0 and the DMRS port #1; and the terminal device maps the CDM group #1 to a second reference signal resource whose index value is #5, that is, determines the second reference signal resource whose index value is #5 as a target reference signal resource used for demodulating the DMRS port #6 and the DMRS port #7, to finally complete demodulation on the first channel.

In addition, when demodulating the first channel, the terminal device may determine, based on an association relationship, at least one reference signal resource that has an association relationship with the first information as the target reference signal resource, where the association relationship indicates an association relationship between a plurality of reference signal resources and a plurality of pieces of second information, the second information includes at least one of the following information: an index number of an antenna port, an index number of a code division multiplexing antenna port group to which the antenna port belongs, an index number of a control resource set CORESET to which a resource carrying DCI belongs, and an index number of a search space set to which the resource carrying the DCI belongs, and the first information is one of the plurality of pieces of second information.

For example, the association relationship indicates the association relationship between the plurality of reference signal resources and the plurality of pieces of second information (for example, index values of CDM groups), and the association relationship indicates that the CDM group #0 corresponds to a reference signal resource whose index value is #4, and the CDM group #1 corresponds to a reference signal resource whose index value is #6.

For example, a value in the DMRS port field carried in the DCI #1 received by the terminal device is 1. In this case, DMRS ports indicated by the value 1 in the DMRS port field include a DMRS port #4 and a DMRS port #5. A value in the DMRS port field carried in the DCI #2 received by the terminal device is 2. In this case, DMRS ports indicated by the value 2 in the DMRS port field include a DMRS port #2 and a DMRS port #3.

Assuming that a value of a DMRS type is 1, a grouping status that is of a CDM group to which DMRS ports belong and that is predefined in a protocol is as follows: DMRS ports included in the CDM group #0 are a DMRS port #0, a DMRS port #1, a DMRS port #4, and a DMRS port #5, and DMRS ports included in the CDM group #1 are a DMRS port #2, a DMRS port #3, a DMRS port #6, and a DMRS port #7.

When determining the target reference signal resource for demodulating the first channel, the terminal device may map the CDM group #0 to a second reference signal resource whose index value is #4, that is, determine the second reference signal resource whose index value is #4 as a target reference signal resource used for demodulating the DMRS port #4 and the DMRS port #5; and map the CDM group #1 to a second reference signal resource whose index value is #6, that is, determine the second reference signal resource whose index value is #6 as a target reference signal resource used for demodulating the DMRS port #2 and the DMRS port #3, to finally complete demodulation on the first channel.

In addition, the association relationship indicates the association relationship between the plurality of reference signal resources and the plurality of pieces of second information (for example, index numbers of search space sets in which the DCI for scheduling the first channel is located), and the association relationship indicates that a search space set #1 corresponds to a reference signal resource whose index value is #5, and a search space set #2 corresponds to a reference signal resource whose index value is #7.

For example, an index number of a search space set in which the DCI #1 received by the terminal device is located is #1, and an index number of a search space set in which the DCI #2 received by the terminal device is located is #2.

When determining the target reference signal resource for demodulating the first channel, the terminal device may map the search space set #1 to a second reference signal resource whose index value is #5, that is, determine the second reference signal resource whose index value is #5 as a target reference signal resource used for demodulating a DMRS port corresponding to the data #1; and map the search space set #2 to a second reference signal resource whose index value is #7, that is, determine the second reference signal resource whose index value is #7 as a target reference signal resource used for demodulating a DMRS port corresponding to the data #2, to finally complete demodulation on the first channel.

In addition, the terminal device may further determine, based on a time domain resource location of the first channel scheduled by using the DCI, the target reference signal resource for demodulating the first channel.

For example, the time domain resource location of the first channel is a slot #1, and the terminal device may determine whether a CORESET exists in the slot #1. If the CORESET exists in the slot #1, the terminal device may determine, as the target reference signal resource, a reference signal resource corresponding to a CORESET that has a smallest index value and that is included in the slot #1. For example, if CORESETs included in the slot #1 are a CORESET #0 to a CORESET #3, the terminal device may determine a reference signal resource corresponding to the CORESET #0 as the target reference signal resource.

If the CORESET does not exist in the slot #1, the terminal device may determine, as the target reference signal resource, a reference signal resource corresponding to a CORESET that has a smallest index value and that is included in a slot closest to the slot #1. For example, the terminal device determines, as the target reference signal resource, a reference signal resource corresponding to a CORESET that has a smallest index value and that is included in a slot #0 closest to the slot #1. For example, if CORESETs included in the slot #0 are a CORESET #1 to a CORESET #3, the terminal device may determine a reference signal resource corresponding to the CORESET #1 as the target reference signal resource.

The reference signal resource corresponding to the CORESET may be a CORESET that has an association relationship with the CORESET, or may be a default CORESET. This is not limited in this application.

It should be noted that for Scenario 2, the plurality of pieces of data may be simultaneously sent by the plurality of TRPs, or the plurality of pieces of data may be sequentially sent by the plurality of TRPs at different times. If the plurality of pieces of data may be simultaneously sent by the plurality of TRPs, that is, time domain resources carrying the plurality of pieces of data at least partially overlap, when the terminal device determines the target reference signal resource for demodulating the first channel, it needs to be ensured that target reference signal resources corresponding to different DCI are reference signal resources that can be simultaneously received by the terminal device.

In another implementation, when demodulating the first channel, the terminal device may determine at least one reference signal resource from the at least two first reference signal resources as the target reference signal resource based on the first information, where the first information is information about DCI for scheduling the first channel; and demodulate the first channel based on the target reference signal resource.

The terminal device may determine the target reference signal resource from the at least two first reference signal resources, and demodulate the first channel based on the target reference signal resource. For a method for the terminal device to demodulate the first channel based on the target reference signal resource determined from the at least two first reference signal resources, refer to the related descriptions in the method for the terminal device to demodulate the first channel based on the target reference signal resource determined from the at least two second reference signal resources in Scenario 2. For brevity, details are not described herein again.

Scenario 3: DPS Scenario

For example, in the DPS scenario, data scheduled by using DCI #1 at a first moment may be from a TRP #1, and data scheduled by using DCI #2 at a second moment may be from a TRP #2.

More specifically, for example, the data may be sent by the TRP #1 at the first moment, and the data may be sent by the TRP #2 at the second moment.

Usually, there may be two types of data carried on the first channel, for example, data #1 and data #2. The two types of data may be sent at different times and scheduled by using DCI at different moments. Optionally, the two types of data may be from different TRPs.

Optionally, the data #1 may be a codeword #1, and the data #2 may be a codeword #2. Alternatively, the data #1 may be data from a layer 1 to a layer X, and the data #2 may be data from a layer X+1 to a layer Y. Herein, X is an integer greater than or equal to 1, and Y is an integer greater than or equal to X+1.

Optionally, the data #1 may be scheduled by using the DCI #1 at the first moment, and the data #2 may be scheduled by using the DCI #2 at the second moment. Optionally, the data #1 may be scheduled by using the DCI #1 in a first format, and the data #2 may be scheduled by using the DCI #2 in a second format. Optionally, the data #1 may be scheduled by using the DCI #1 in a first search space set and/or a first control resource set, and the data #2 may be scheduled by using the DCI #2 in a second search space set and/or a second control resource set.

In Scenario 3, the terminal device receives a plurality of pieces of data and a plurality of pieces of DCI at different moments, where the plurality of pieces of data may be from the different TRPs at the different moments. For example, the terminal device receives, at the first moment, the DCI #1 and the data #1 scheduled by using the DCI #1, and the terminal device receives, at the second moment, the DCI #2 and the data #2 scheduled by using the DCI #2. The data #1 is from the TRP #1, and the data #2 is from the TRP #2. The DCI #1 is from the TRP #1, and the DCI #2 is from the TRP #2. Alternatively, the DCI #1 and the DCI #2 are from a same TRP (for example, a primary TRP). For example, a value in a DMRS port field carried in the DCI #1 received by the terminal device is 1. It is assumed that DMRS ports indicated by the value 1 of the DMRS port field include a DMRS port #4 and a DMRS port #5. A value in a DMRS port field carried in the DCI #2 received by the terminal device is 2. It is assumed that DMRS ports indicated by the value 2 of the DMRS port field include a DMRS port #6 and a DMRS port #7.

Assuming that a value of a DMRS type is 1, a grouping status that is of a CDM group to which DMRS ports belong and that is predefined in a protocol is as follows: DMRS ports included in a CDM group #0 are a DMRS port #0, a DMRS port #1, a DMRS port #4, and a DMRS port #5, and DMRS ports included in a CDM group #1 are a DMRS port #2, a DMRS port #3, a DMRS port #6, and a DMRS port #7.

When determining the target reference signal resource for demodulating the first channel, the terminal device may map a CDM group with a smaller index value to a second reference signal resource with a smaller index value, and map a CDM group with a larger index value to a second reference signal resource with a larger index value. For example, the terminal device maps the CDM group #0 to a second reference signal resource whose index value is #4, that is, determines the second reference signal resource whose index value is #4 as a target reference signal resource used for demodulating the DMRS port #4 and the DMRS port #5; and the terminal device maps the CDM group #1 to a second reference signal resource whose index value is #6, that is, determines the second reference signal resource whose index value is #6 as a target reference signal resource used for demodulating the DMRS port #6 and the DMRS port #7, to finally complete demodulation on the first channel.

In addition, when demodulating the first channel, the terminal device may determine, based on an association relationship, at least one reference signal resource that has an association relationship with the first information as the target reference signal resource, where the association relationship indicates an association relationship between a plurality of reference signal resources and a plurality of pieces of second information, the second information includes at least one of the following information: an index number of an antenna port, an index number of a code division multiplexing antenna port group to which the antenna port belongs, an index number of a control resource set CORESET to which a resource carrying DCI belongs, and an index number of a search space set to which the resource carrying the DCI belongs, and the first information is one of the plurality of pieces of second information.

For example, the association relationship indicates the association relationship between the plurality of reference signal resources and the plurality of pieces of second information (for example, index values of CDM groups), and the association relationship indicates that the CDM group #0 corresponds to a reference signal resource whose index value is #4, and the CDM group #1 corresponds to a reference signal resource whose index value is #6.

For example, a value in the DMRS port field carried in the DCI #1 received by the terminal device is 1. In this case, DMRS ports indicated by the value 1 in the DMRS port field include a DMRS port #4 and a DMRS port #5. A value in the DMRS port field carried in the DCI #2 received by the terminal device is 2. In this case, DMRS ports indicated by the value 2 in the DMRS port field include a DMRS port #2 and a DMRS port #3.

Assuming that a value of a DMRS type is 1, a grouping status that is of a CDM group to which DMRS ports belong and that is predefined in a protocol is as follows: DMRS ports included in the CDM group #0 are a DMRS port #0, a DMRS port #1, a DMRS port #4, and a DMRS port #5, and DMRS ports included in the CDM group #1 are a DMRS port #2, a DMRS port #3, a DMRS port #6, and a DMRS port #7.

When determining the target reference signal resource for demodulating the first channel, the terminal device may map the CDM group #0 to a second reference signal resource whose index value is #4, that is, determine the second reference signal resource whose index value is #4 as a target reference signal resource used for demodulating the DMRS port #4 and the DMRS port #5; and map the CDM group #1 to a second reference signal resource whose index value is #6, that is, determine the second reference signal resource whose index value is #6 as a target reference signal resource used for demodulating the DMRS port #2 and the DMRS port #3, to finally complete demodulation on the first channel.

In addition, the association relationship indicates the association relationship between the plurality of reference signal resources and the plurality of pieces of second information (for example, index numbers of search space sets in which the DCI for scheduling the first channel is located), and the association relationship indicates that a search space set #1 corresponds to a reference signal resource whose index value is #5, and a search space set #2 corresponds to a reference signal resource whose index value is #7.

For example, an index number of a search space set in which the DCI #1 received by the terminal device is located is #1, and an index number of a search space set in which the DCI #2 received by the terminal device is located is #2.

When determining the target reference signal resource for demodulating the first channel, the terminal device may map the search space set #1 to a second reference signal resource whose index value is #5, that is, determine the second reference signal resource whose index value is #5 as a target reference signal resource used for demodulating a DMRS port corresponding to the data #1; and map the search space set #2 to a second reference signal resource whose index value is #7, that is, determine the second reference signal resource whose index value is #7 as a target reference signal resource used for demodulating a DMRS port corresponding to the data #2, to finally complete demodulation on the first channel.

In another implementation, when demodulating the first channel, the terminal device may determine at least one reference signal resource from the at least two first reference signal resources as the target reference signal resource based on the first information, where the first information is information about DCI for scheduling the first channel; and demodulate the first channel based on the target reference signal resource.

The terminal device may determine the target reference signal resource from the at least two first reference signal resources, and demodulate the first channel based on the target reference signal resource. For a method for the terminal device to demodulate the first channel based on the target reference signal resource determined from the at least two first reference signal resources, refer to the related descriptions in the method for the terminal device to demodulate the first channel based on the target reference signal resource determined from the at least two second reference signal resources in Scenario 2. For brevity, details are not described herein again.

It should be further noted that the technical solutions in this application may be further applied to a single TRP scenario in which the network device simultaneously sends a plurality of pieces of data by using spatial relation parameters corresponding to different reference signal resources. For a specific implementation, refer to the foregoing related descriptions. For brevity, details are not described herein again.

It should be further noted that the association relationship in this application may be configured by a TRP, or may be predefined in a protocol. The association relationship may be a direct association relationship or an indirect association relationship. The indirect association relationship may be an association relationship that is between a target reference signal resource used for demodulation and a DMRS port and that is obtained by using one or more other intermediates. The intermediate may be, for example, a TRP ID or a cell ID.

It should be understood that the foregoing method in the present disclosure may also be used as an uplink PUSCH beam indication method or a spatial relation information indication method. Correspondingly, in this case, the TCI field is replaced with an SRI field, the TCI state/QCL is replaced with SpatialRelationInfo/SpatialRelationInfo, and the reference signal indicated by the TCI state/QCL is replaced with a reference signal indicated by SpatialRelationInfo/SpatialRelationInfo.

Optionally, in a multi-TRP scenario, one PDSCH scheduled by using one piece of DCI may be from one or more TRPs. In a possible implementation, whether the PDSCH is from one or two TRPs is determined based on a TCI field in the DCI.

It should be understood that the at least one reference signal resource is determined from the at least two first reference signal resources as the target reference signal resource based on the transmission configuration indicator field carried in the DCI for scheduling the first channel. In a possible implementation, the at least one reference signal resource is determined from the at least two first reference signal resources as the target reference signal resource based on a quantity of TCI states indicated in the transmission configuration indicator field carried in the DCI for scheduling the first channel (or based on a maximum quantity of TCI states indicated by each codepoint in all candidate codepoints in the transmission configuration indicator field in the DCI). In another possible implementation, the at least one reference signal resource is determined from the at least two first reference signal resources as the target reference signal resource based on a quantity of TCI states indicated in the transmission configuration indicator field carried in the DCI for scheduling the first channel and whether the TCI states are the same.

Alternatively, it should be understood that the at least one reference signal resource is determined from the at least two second reference signal resources as the target reference signal resource based on the transmission configuration indicator field carried in the DCI for scheduling the first channel. In a possible implementation, the at least one reference signal resource is determined from the at least two second reference signal resources as the target reference signal resource based on a quantity of TCI states indicated in the transmission configuration indicator field carried in the DCI for scheduling the first channel (or based on a maximum quantity of TCI states indicated by each codepoint in all candidate codepoints in the transmission configuration indicator field in the DCI). In another possible implementation, the at least one reference signal resource is determined from the at least two second reference signal resources as the target reference signal resource based on a quantity of TCI states indicated in the transmission configuration indicator field carried in the DCI for scheduling the first channel and whether the TCI states are the same.

It should be understood that in the following embodiment or implementation, "determining at least one reference signal resource from the at least two second reference signal resources as a target reference signal resource" may be "determining a reference signal resource indicated by at least one of two default transmission configuration indicator states as a target reference signal resource", or may be "determining at least one reference signal resource from the at least two first reference signal resources as a target reference signal resource".

In this embodiment of this application, the two default TCI states may be defined, and type D QCL information (which may indicate the foregoing at least two first reference signal resources) indicated by the two TCI states is used to cache data. After the DCI is decoded, at least one of type A/B/C QCL information (which may indicate the foregoing at least two second reference signal resources) indicated by the two TCI states may be used to demodulate the PDSCH.

To be specific, type D QCL information of a PDSCH DMRS port may be the type D QCL information indicated by the two default TCI states, and type A/B/C QCL information of the PDSCH DMRS port may be determined based on an indication value in the TCI field included in the DCI for scheduling the PDSCH.

It should be understood that the two default TCI states may be a first TCI state and a second TCI state. The first TCI state and the second TCI state may be implemented in a plurality of manners.

For example, the first TCI state may be a TCI state of a CORESET with a smallest identifier in a latest slot, and the second TCI state may correspond to a type D QCL RS in an activated TCI state and a type D QCL RS in the TCI state of the CORESET with the smallest identifier in the latest slot. The two reference signal resources (type D QCL RSs corresponding to the two TCI states) may be reported together in one packet, and the two reference signal resources reported in one packet are reference signal resources that can be simultaneously received by the terminal device.

For another example, the first TCI state is a TCI state of a CORESET with a smallest identifier in a latest slot, and the second TCI state is a TCI state that is activated by using a MAC CE and that is paired with the first TCI state.

For another example, in all codepoints in the transmission configuration indicator field in the DCI, two TCI states indicated by a codepoint with a smallest codepoint value in codepoints indicating two TCI states are used as the two default TCI states.

It should be understood that the two TCI states may alternatively be determined in another manner. This is not limited in this application.

In a possible implementation, that the at least one reference signal resource is determined from the at least two second reference signal resources as the target reference signal resource based on the transmission configuration indicator field carried in the DCI for scheduling the first channel includes:
  when a quantity of transmission configuration indicator states (TCI state) indicated in the transmission configuration indicator field is 1, determining a $1^{st}$ second reference signal resource in the at least two second reference signal resources as the target reference signal resource; or
  when a quantity of transmission configuration indicator states (TCI state) indicated in the transmission configuration indicator field is 2, determining two of the at least two second reference signal resources as the target reference signal resources.

In a possible implementation, when the scheduling offset is less than or equal to the preset threshold, the terminal device may determine the two TCI states, assumes that the type D QCL information of the first channel or the type D QCL information of the DMRS port of the first channel is the same as the type D QCL information indicated by the two TCI states, and determines, from the two TCI states, one of the type A QCL information, the type B QCL information, and the type C QCL information of the first channel based on the value in the TCI field carried in the DCI for scheduling the first channel or the quantity of TCI states indicated in the TCI field carried in the DCI for scheduling the first channel.

Optionally, when one piece of DCI is used to schedule a plurality of TRPs, there is a TCI field, and the scheduling offset is less than K, the terminal device determines, based on the TCI field in the DCI for scheduling the PDSCH, the type A/B/C QCL information for demodulating the PDSCH. The following describes the process in detail.

1. The terminal device determines that two pieces of type D QCL information in the two default TCI states are used to receive a PDSCH whose scheduling offset is less than K.

2. The terminal device determines, based on information about the TCI field in the DCI for scheduling the PDSCH, the type A/B/C QCL information indicated by at least one of the two default TCI states, to demodulate the PDSCH.

It should be understood that when the information about the TCI field indicates that there is one TCI state, the terminal device may demodulate the PDSCH based on the type A/B/C QCL information indicated by the first TCI state in the default TCI states. When the information about the TCI field indicates that there are two TCI states, the terminal device may demodulate the PDSCH based on the type A/B/C QCL information indicated by the two TCI states in the default TCI states.

For example, the UE determines that the default TCI states are TCI n1 {type A RS a1, type D RS b1}+TCI m1 {type A RS c1, type D RS d1}. The value in the TCI field indicated by the DCI for scheduling the PDSCH is 001, that is, the DCI indicates TCI n2 {type A RS a2, type D RS b2}. In this case, the UE demodulates the PDSCH based on {type A RS a1} indicated by TCI n1.

In another possible implementation, that the at least one reference signal resource is determined from the at least two second reference signal resources as the target reference signal resource based on the antenna port field carried in the DCI for scheduling the first channel includes:
  when a quantity of CDM groups to which DMRS ports indicated in the antenna port field belong is 1, determining a $1^{st}$ second reference signal resource in the at least two second reference signal resources as the target reference signal resource; or
  when a quantity of CDM groups to which DMRS ports indicated in the antenna port field belong is 2 (or 3), determining two of the at least two second reference signal resources as the target reference signal resources.

In another possible implementation, that the at least one reference signal resource is determined from the at least two second reference signal resources as the target reference signal resource based on the antenna port field and the transmission configuration indicator field that are carried in the DCI for scheduling the first channel includes:
  when a quantity of CDM groups to which DMRS ports indicated in the antenna port field belong is 1 and a quantity of transmission configuration indicator states (TCI state) indicated in the transmission configuration indicator field is 1, determining a 1st second reference signal resource in the at least two second reference signal resources as the target reference signal resource; or when a quantity of CDM groups to which DMRS ports indicated in the antenna port field belong is 1 and a quantity of transmission configuration indicator states (TCI state) indicated in the transmission configuration indicator field is 2, determining two of the at least two second reference signal resources as the target reference signal resources.

In another possible implementation, the target reference signal resource is determined based on repetition times of the first channel that are indicated by the repetition times indication information. For example, if the repetition times indicated by the repetition times indication information are N, N first channels or N time-frequency resources are currently scheduled, where all the first channels or all the time-frequency resources are used to carry a same transport block (Transmission Block, TB).

In another possible implementation, that the at least one reference signal resource is determined from the at least two second reference signal resources as the target reference signal resource based on the repetition times indication information and the transmission configuration indicator field that are carried in the DCI for scheduling the first channel includes:

when repetition times indicated by the repetition times indication information are 1 or in a default state and a quantity of transmission configuration indicator states (TCI state) indicated in the transmission configuration indicator field is 1, determining a $1^{st}$ second reference signal resource in the at least two second reference signal resources as the target reference signal resource;

when repetition times indicated by the repetition times indication information are 1 or in a default state and a quantity of transmission configuration indicator states (TCI state) indicated in the transmission configuration indicator field is 2, determining two of the at least two second reference signal resources as the target reference signal resources; or when repetition times indicated by the repetition times indication information are greater than or equal to 2 and a quantity of transmission configuration indicator states (TCI state) indicated in the transmission configuration indicator field is 2, determining two of the at least two second reference signal resources as the target reference signal resources.

In another possible implementation, that at least two reference signal resources are determined from the at least two second reference signal resources as target reference signal resources based on transmission mechanism indication information and the transmission configuration indicator field carried in the DCI for scheduling the first channel includes:

when the transmission mechanism indication information indicates repeated transmission and a quantity of transmission configuration indicator states (TCI state) indicated in the transmission configuration indicator field is 2, determining reference signal resources on a second channel as the target reference signal resources; or when the transmission mechanism indication information does not indicate repeated transmission and a quantity of transmission configuration indicator states (TCI state) indicated in the transmission configuration indicator field is 2, determining reference signal resources on a second channel as the target reference signal resources.

Optionally, the repeated transmission indicated by the transmission mechanism indication information means that two frequency domain resource blocks indicated by the DCI for scheduling the first channel respectively correspond to different TCI states.

Optionally, the two frequency domain resource blocks carry a same TB.

Optionally, the different TCI states are the foregoing two default TCI states.

Optionally, the repeated transmission indicated by the transmission mechanism indication information means that two TCI states respectively correspond to two time domain resource blocks indicated by the DCI for scheduling the first channel.

Optionally, the two time domain resource blocks carry a same TB.

Optionally, the two time domain resource blocks are located in a same slot.

The foregoing technical solution may be applied to the multi-TRP scenario. When the scheduling offset is less than the preset threshold, the terminal device obtains the DCI through decoding, and may learn whether the PDSCH is data transmitted by a single TRP or data transmitted by a plurality of TRPs, to determine a correspondence between the PDSCH DMRS port and the TCI state or the QCL information.

It should be understood that the embodiments of this application may be further applied to another scenario. For example, a plurality of pieces of DCI may be used to schedule PDSCHs from different TRPs at different moments or at a same moment. When the scheduling offset is less than the preset threshold, the terminal device may determine, based on an index number of a CORESET in which the current DCI is located, the TCI state or the QCL information of the PDSCH scheduled by using the DCI. For example, the terminal device determines, as the TCI state of the PDSCH, a TCI state of a CORESET with a smallest index in CORESETs associated with the CORESET; or determines, as the TCI state of the PDSCH, a TCI state of a CORESET that is in a slot closest to the DCI and that has a smallest CORESET index in CORESETs associated with the CORESET.

The foregoing describes, in detail with reference to FIG. 1 and FIG. 2, the signal transmission method provided in the embodiments of this application. The following describes, in detail with reference to FIG. 3 to FIG. 6, communications apparatuses provided in embodiments of this application.

Figure 3:
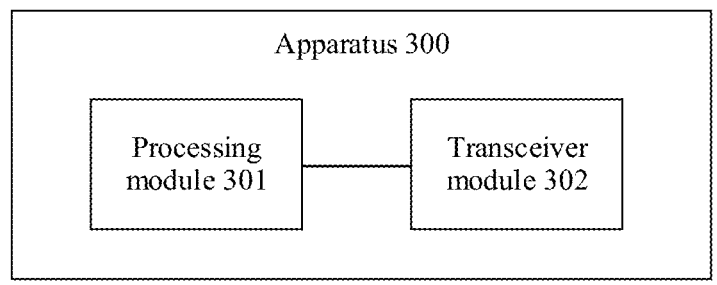
FIG. 3 is a schematic block diagram of a signal transmission apparatus according to an embodiment of this application.

FIG. 3 is a schematic block diagram of a signal transmission apparatus 300 according to an embodiment of this application. The apparatus 300 is configured to perform the method performed by the terminal device in the foregoing method embodiment. Optionally, a specific form of the apparatus 300 may be a chip in the terminal device. This is not limited in this embodiment of this application. The apparatus 300 includes:

a processing module 301, configured to determine at least two first reference signal resources; and a transceiver module 302, configured to receive a first channel based on the at least two first reference signal resources when a scheduling offset is less than or equal to a preset threshold and/or there is no spatial relation parameter information indication field in downlink control information DCI, where the processing module 301 is further configured to demodulate the first channel.

Optionally, the processing module 301 is further configured to: obtain first spatial relation parameter information, where the first spatial relation parameter information indicates at least two reference signal resources and indicates that a type that is of a spatial relation parameter and that is associated with the at least two reference signal resources is a QCL type D; and determine the at least two reference signal resources as the at least two first reference signal resources.

Optionally, the processing module 301 is further configured to: obtain second spatial relation parameter information, where the second spatial relation parameter information indicates at least two second reference signal resources and a QCL type associated with the at least two second reference signal resources, and the QCL type associated with the at least two second reference signal resources includes at least one of a QCL type A, a QCL type B, and a QCL type C; and
  determine at least one second reference signal resource from the at least two second reference signal resources as a target reference signal resource; and demodulate the first channel based on the target reference signal resource.

Optionally, the processing module 301 is further configured to: obtain configuration information by using radio resource control RRC signaling or media access control control element MAC CE signaling, where the configuration information indicates the first spatial relation parameter information; and
  obtain the first spatial relation parameter information based on the configuration information; and/or
  obtain the second spatial relation parameter information based on the configuration information.

Optionally, the processing module 302 is further configured to: determine at least one reference signal resource from the at least two first reference signal resources as a target reference signal resource; and demodulate the first channel based on the target reference signal resource.

Optionally, the processing module 301 is further configured to: determine the at least one second reference signal resource from the at least two second reference signal resources as the target reference signal resource based on first information, where the first information is information about DCI for scheduling the first channel.

Optionally, the processing module 301 is further configured to: determine the at least one reference signal resource from the at least two first reference signal resources as the target reference signal resource based on first information, where the first information is information about DCI for scheduling the first channel.

Optionally, the first information includes at least one of the following:
  an index number of a control resource set in which the DCI for scheduling the first channel is located;
  an index number of a search space set in which the DCI for scheduling the first channel is located;
  an antenna port field carried in the DCI for scheduling the first channel; and
  a transport block field carried in the DCI for scheduling the first channel.

Optionally, the processing module 301 is further configured to determine, based on association information, at least one reference signal resource that has an association relationship with the first information as the target reference signal resource, where the association relationship indicates an association relationship between a plurality of reference signal resources and a plurality of pieces of second information, the second information includes at least one of the following information: an index number of an antenna port, an index number of a code division multiplexing antenna port group to which the antenna port belongs, an index number of a control resource set CORESET to which a resource carrying DCI belongs, and an index number of a search space set to which the resource carrying the DCI belongs, and the first information is one of the plurality of pieces of second information.

Optionally, the at least two first reference signal resources are reference signal resources that are last reported by a terminal device, and at least two reference signals carried on the at least two first reference signal resources are reference signals that can be simultaneously received.

It should be understood that in a possible implementation, the at least two first reference signal resources are a same reference signal resource, and the at least two second reference signal resources are different reference signal resources; and in another possible implementation, the at least two first reference signal resources are different reference signal resources, and the at least two second reference signal resources are different reference signal resources. It should be understood that in this embodiment of this application, the first reference signal resource and the second reference signal resource may be the same or different.

It should be understood that the signal transmission apparatus 300 in this embodiment of this application may correspond to the terminal device in the embodiment of the method 200 in the embodiments of this application, and the apparatus 300 may include modules configured to perform the method performed by the terminal device in the embodiment of the method 200 in FIG. 2. In addition, the foregoing and other operations and/or functions of the modules in the apparatus 300 are separately used to implement corresponding steps performed by the terminal device in the embodiment of the method 200 in FIG. 2. Therefore, beneficial effects in the foregoing method embodiment can also be implemented herein. For brevity, details are not described herein again.

It should be further understood that the modules in the apparatus 300 may be implemented in a form of software and/or hardware. This is not specifically limited. In other words, the apparatus 300 is presented in a form of functional modules. The "module" herein may be an application-specific integrated circuit ASIC, a circuit, a processor that executes one or more software or firmware programs and a memory, an integrated logic circuit, and/or another component that can provide the foregoing functions. Optionally, in a simple embodiment, a person skilled in the art may figure out that the apparatus 300 may be in a form shown in FIG. 4. The processing module 301 may be implemented by a processor 401 and a memory 402 shown in FIG. 4. The transceiver module 302 may be implemented by a transceiver 403 shown in FIG. 4. Specifically, the processor is implemented by executing a computer program stored in the memory. Optionally, when the apparatus 300 is a chip, a function and/or an implementation process of the transceiver module 302 may alternatively be implemented by a pin, a circuit, or the like. Optionally, the memory is a storage unit, for example, a register or a cache, in the chip. The storage unit may alternatively be a storage unit, such as the memory 402 shown in FIG. 4, that is in a computer device and that is located outside the chip.

Figure 4:
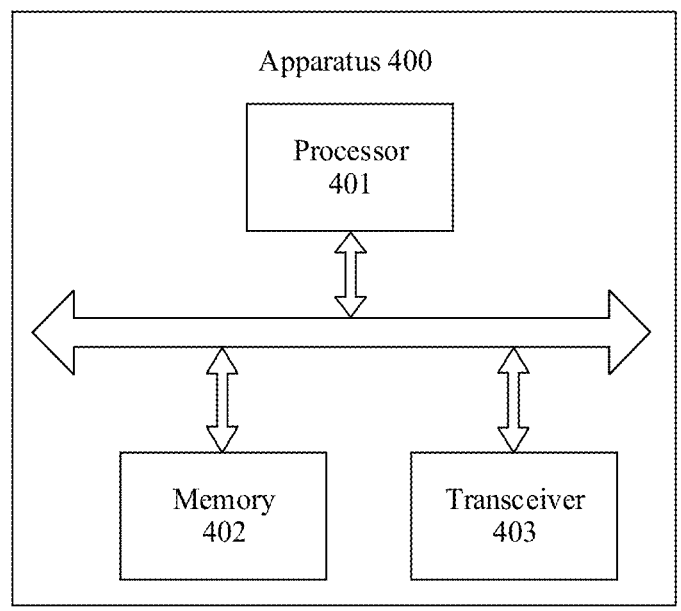
FIG. 4 is a schematic structural diagram of a signal transmission apparatus according to an embodiment of this application.

FIG. 4 is a schematic structural diagram of a signal transmission apparatus 400 according to an embodiment of this application. As shown in FIG. 4, the apparatus 400 includes a processor 401.

In a possible implementation, the processor 401 is configured to determine at least two first reference signal resources.

The processor 401 is further configured to invoke an interface to perform the following action: receiving a first channel based on the at least two first reference signal resources when a scheduling offset is less than or equal to a preset threshold and/or there is no spatial relation parameter information indication field in downlink control information DCI.

The processor 401 is further configured to demodulate the first channel.

Optionally, the processing module 302 is further configured to: obtain first spatial relation parameter information, where the first spatial relation parameter information indicates at least two reference signal resources and indicates that a type that is of a spatial relation parameter and that is associated with the at least two reference signal resources is a QCL type D; and determine the at least two reference signal resources as the at least two first reference signal resources.

Optionally, the processing module 302 is further configured to: obtain second spatial relation parameter information, where the second spatial relation parameter information indicates at least two second reference signal resources and a QCL type associated with the at least two second reference signal resources, and the QCL type associated with the at least two second reference signal resources includes at least one of a QCL type A, a QCL type B, and a QCL type C;

determine at least one second reference signal resource from the at least two second reference signal resources as a target reference signal resource; and demodulate the first channel based on the target reference signal resource.

Optionally, the processor 401 is further configured to: obtain configuration information by using radio resource control RRC signaling or media access control control element MAC CE signaling, where the configuration information indicates the first spatial relation parameter information; and obtain the first spatial relation parameter information based on the configuration information; and/or obtain the second spatial relation parameter information based on the configuration information.

Optionally, the processor 401 is further configured to: determine at least one reference signal resource from the at least two first reference signal resources as a target reference signal resource; and demodulate the first channel based on the target reference signal resource.

Optionally, the processor 401 is further configured to: determine the at least one second reference signal resource from the at least two second reference signal resources as the target reference signal resource based on first information, where the first information is information about DCI for scheduling the first channel.

Optionally, the processor 401 is further configured to: determine the at least one reference signal resource from the at least two first reference signal resources as the target reference signal resource based on first information, where the first information is information about DCI for scheduling the first channel.

Optionally, the first information includes at least one of the following:

an index number of a control resource set in which the DCI for scheduling the first channel is located;

an index number of a search space set in which the DCI for scheduling the first channel is located;

an antenna port field carried in the DCI for scheduling the first channel;

a transport block field carried in the DCI for scheduling the first channel;

repetition times indication information carried in the DCI for scheduling the first channel; and a transmission configuration indicator field carried in the DCI for scheduling the first channel.

Optionally, the processor 401 is further configured to determine, based on association information, at least one reference signal resource that has an association relationship with the first information as the target reference signal resource, where the association relationship indicates an association relationship between a plurality of reference signal resources and a plurality of pieces of second information, the second information includes at least one of the following information: an index number of an antenna port, an index number of a code division multiplexing antenna port group to which the antenna port belongs, an index number of a control resource set CORESET to which a resource carrying DCI belongs, and an index number of a search space set to which the resource carrying the DCI belongs, and the first information is one of the plurality of pieces of second information.

Optionally, the at least two first reference signal resources are reference signal resources that are last reported by a terminal device, and at least two reference signals carried on the at least two first reference signal resources are reference signals that can be simultaneously received.

It should be understood that the processor 401 may invoke the interface to perform the foregoing receiving action. The invoked interface may be a logical interface or a physical interface. This is not limited in this embodiment of this application. Optionally, the physical interface may be implemented by a transceiver. Optionally, the apparatus 400 may further include a transceiver 403.

Optionally, the apparatus 400 further includes a memory 402, and the memory 402 may store program code in the foregoing method embodiment, so that the processor 401 invokes the program code.

Specifically, if the apparatus 400 includes the processor 401, the memory 402, and the transceiver 403, the processor 401, the memory 402, and the transceiver 403 communicate with each other through an inner connection path, to transmit a control signal and/or a data signal. In a possible design, the processor 401, the memory 402, and the transceiver 403 may be implemented by a chip. The processor 401, the memory 402, and the transceiver 403 may be implemented in a same chip, or may be implemented in different chips, or functions of any two of the processor 401, the memory 402, and the transceiver 403 are implemented in one chip. The memory 402 may store the program code, and the processor 401 invokes the program code stored in the memory 402, to implement a corresponding function of the apparatus 400.

It should be understood that the apparatus 400 may be further configured to perform other steps and/or operations on the terminal device side in the foregoing embodiments. For brevity, details are not described herein.

Figure 5:
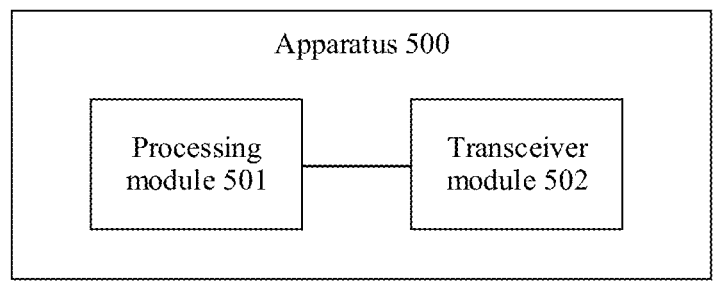
FIG. 5 is another schematic block diagram of a signal transmission apparatus according to an embodiment of this application.

FIG. 5 is a schematic block diagram of a signal transmission apparatus 500 according to an embodiment of this application. The apparatus 500 is configured to perform the method performed by the network device in the foregoing method embodiment. Optionally, a specific form of the apparatus 500 may be a chip in the network device. This is not limited in this embodiment of this application. The apparatus 500 includes:

a processing module 501, configured to obtain configuration information, where the configuration information indicates the first spatial relation parameter information, and the first spatial relation parameter information indicates at least two reference signal resources and indicates that a type that is of a spatial relation parameter and that is associated with the at least two reference signal resources is a QCL type D; and a transceiver module 502, configured to send the configuration information by using radio resource control RRC signaling or media access control control element MAC CE signaling, where the transceiver module 502 is further configured to send a first channel based on at least two first reference signal resources, where the at least two first reference signal resources are the at least two reference signal resources.

Optionally, the configuration information is further used to indicate second spatial relation parameter information, the second spatial relation parameter information indicates at least two second reference signal resources and a QCL type associated with the at least two second reference signal resources, and the QCL type associated with the at least two second reference signal resources includes at least one of a QCL type A, a QCL type B, and a QCL type C.

Optionally, the transceiver module 502 is further configured to send association information to a terminal device by using the RRC signaling or the MAC CE signaling, where the association information indicates an association relationship between a plurality of reference signal resources and a plurality of pieces of second information, the second information includes at least one of the following information: an index number of an antenna port, an index number of a code division multiplexing antenna port group to which the antenna port belongs, an index number of a control resource set CORESET to which a resource carrying DCI belongs, and an index number of a search space set to which the resource carrying the DCI belongs, and the plurality of pieces of second information include first information.

Optionally, the first information includes at least one of the following:

an index number of a control resource set in which the DCI for scheduling the first channel is located;
an index number of a search space set in which the DCI for scheduling the first channel is located;
an antenna port field carried in the DCI for scheduling the first channel;
a transport block field carried in the DCI for scheduling the first channel;
repetition times indication information carried in the DCI for scheduling the first channel; and
a transmission configuration indicator field carried in the DCI for scheduling the first channel.

It should be understood that the signal transmission apparatus 500 in this embodiment of this application may correspond to the network device in the embodiment of the method 200 in the embodiments of this application, and the apparatus 500 may include modules configured to perform the method performed by the network device in the embodiment of the method 200 in FIG. 2. In addition, the foregoing and other operations and/or functions of the modules in the apparatus 500 are separately used to implement corresponding steps performed by the network device in the embodiment of the method 200 in FIG. 2. Therefore, beneficial effects in the foregoing method embodiment can also be implemented herein. For brevity, details are not described herein again.

It should be further understood that the modules in the apparatus 500 may be implemented in a form of software and/or hardware. This is not specifically limited. In other words, the apparatus 500 is presented in a form of functional modules. The "module" herein may be an application-specific integrated circuit ASIC, a circuit, a processor that executes one or more software or firmware programs and a memory, an integrated logic circuit, and/or another component that can provide the foregoing functions. Optionally, in a simple embodiment, a person skilled in the art may figure out that the apparatus 500 may be in a form shown in FIG. 6. The processing module 501 may be implemented by a processor 601 and a memory 602 shown in FIG. 6. The transceiver module 502 may be implemented by a transceiver 603 shown in FIG. 6. Specifically, the processor is implemented by executing a computer program stored in the memory. Optionally, when the apparatus 500 is a chip, a function and/or an implementation process of the transceiver module 502 may alternatively be implemented by a pin, a circuit, or the like. Optionally, the memory is a storage unit, for example, a register or a cache, in the chip. The storage unit may alternatively be a storage unit, such as the memory 602 shown in FIG. 6, that is in the computer device and that is located outside the chip.

Figure 6:
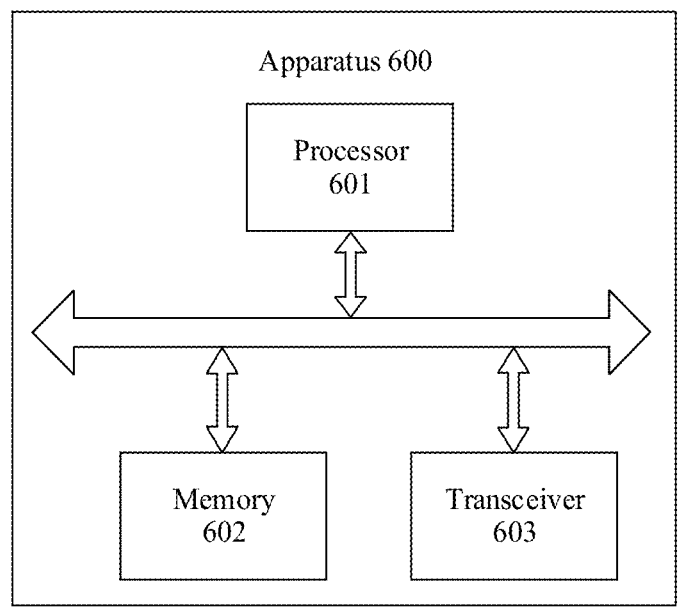
FIG. 6 is another schematic structural diagram of a signal transmission apparatus according to an embodiment of this application.

FIG. 6 is a schematic structural diagram of a signal transmission apparatus 600 according to an embodiment of this application. As shown in FIG. 6, the apparatus 600 includes a processor 601.

In a possible implementation, the processor 601 is configured to obtain configuration information, where the configuration information indicates the first spatial relation parameter information, and the first spatial relation parameter information indicates at least two reference signal resources and indicates that a type that is of a spatial relation parameter and that is associated with the at least two reference signal resources is a QCL type D.

The processor 601 is further configured to invoke an interface to perform the following actions: sending the configuration information by using radio resource control RRC signaling or media access control control element MAC CE signaling; and sending a first channel based on at least two first reference signal resources, where the at least two first reference signal resources are the at least two reference signal resources.

Optionally, the configuration information is further used to indicate second spatial relation parameter information, the second spatial relation parameter information indicates at least two second reference signal resources and a QCL type associated with the at least two second reference signal resources, and the QCL type associated with the at least two second reference signal resources includes at least one of a QCL type A, a QCL type B, and a QCL type C.

Optionally, the processor 601 is further configured to invoke the interface to perform the following action: sending association information to a terminal device by using the RRC signaling or the MAC CE signaling, where the association information indicates an association relationship between a plurality of reference signal resources and a plurality of pieces of second information, the second information includes at least one of the following information: an index number of an antenna port, an index number of a code division multiplexing antenna port group to which the antenna port belongs, an index number of a control resource set CORESET to which a resource carrying DCI belongs, and an index number of a search space set to which the resource carrying the DCI belongs, and the plurality of pieces of second information include first information.

Optionally, the first information includes at least one of the following:

an index number of a control resource set in which the DCI for scheduling the first channel is located;

an index number of a search space set in which the DCI for scheduling the first channel is located;

an antenna port field carried in the DCI for scheduling the first channel;

a transport block field carried in the DCI for scheduling the first channel;

repetition times indication information carried in the DCI for scheduling the first channel; and a transmission configuration indicator field carried in the DCI for scheduling the first channel.

It should be understood that the processor 601 may invoke the interface to perform the foregoing receiving actions. The invoked interface may be a logical interface or a physical interface. This is not limited in this embodiment of this application. Optionally, the physical interface may be implemented by a transceiver. Optionally, the apparatus 600 may further include a transceiver 603.

Optionally, the apparatus 600 further includes a memory 602, and the memory 602 may store program code in the foregoing method embodiment, so that the processor 601 invokes the program code.

Specifically, if the apparatus 600 includes the processor 601, the memory 602, and the transceiver 603, the processor 601, the memory 602, and the transceiver 603 communicate with each other through an inner connection path, to transmit a control signal and/or a data signal. In a possible design, the processor 601, the memory 602, and the transceiver 603 may be implemented by a chip. The processor 601, the memory 602, and the transceiver 603 may be implemented in a same chip, or may be implemented in different chips, or functions of any two of the processor 601, the memory 602, and the transceiver 603 are implemented in one chip. The memory 602 may store the program code, and the processor 601 invokes the program code stored in the memory 602, to implement a corresponding function of the apparatus 600.

It should be understood that the apparatus 600 may be further configured to perform other steps and/or operations on the terminal device side in the foregoing embodiments. For brevity, details are not described herein.

A person of ordinary skill in the art may be aware that units, algorithms, and steps in the examples described with reference to the embodiments disclosed in this application can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief descriptions, for a detailed working process of the foregoing system, apparatus, and unit, reference may be made to a corresponding process in the foregoing method embodiment. Details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A signal transmission method, comprising:

determining at least two first reference signal resources;

receiving a first channel based on a first target reference signal resource in response to a scheduling offset being less than or equal to a preset threshold, wherein the first target reference signal resource belongs to the at least two first reference signal resources and is determined based on first information, and wherein the first information is information about downlink control information (DCI) for scheduling the first channel, wherein the first target reference signal resource is a reference signal resource corresponding to a control resource set (CORESET) that is in a slot closest to the first channel and that has a smallest index value in CORESETs having an association relationship with the first information, and wherein the first channel carries a first type of data and a second type of data, wherein the first target reference signal resource is used to demodulate the first type of data; and determining a second target reference signal resource from the at least two first reference signal resources, wherein the second target reference signal resource is used to demodulate the second type of data.

2. The method according to claim 1, wherein the first information comprises at least one of the following:
- an index number of a control resource set in which the DCI for scheduling the first channel is located;
- an index number of a search space set in which the DCI for scheduling the first channel is located;
- an antenna port field carried in the DCI for scheduling the first channel;
- a transport block field carried in the DCI for scheduling the first channel;
- repetition times indication information carried in the DCI for scheduling the first channel; or
- a transmission configuration indicator field carried in the DCI for scheduling the first channel.

3. The method according to claim 1, wherein the method further comprises:
- determining at least one reference signal resource from the at least two first reference signal resources as the first target reference signal resource; and
- demodulating the first channel based on the first target reference signal resource.

4. The method according to claim 3, wherein the determining the at least one reference signal resource from the at least two first reference signal resources as the first target reference signal resource comprises:
- determining the at least one reference signal resource from the at least two first reference signal resources as the first target reference signal resource based on the first information.

5. The method according to claim 1, wherein the first target reference signal resource is associated with one of the at least two first reference signal resources, and wherein the second target reference signal resource is associated with a different one of the at least two first reference signal resources.

6. The method according to claim 1, wherein the first type of data is a first codeword, and the second type of data is a second codeword.

7. The method according to claim 1, wherein the first type of data is data from a first layer to a second layer, and the second type of data is data from a third layer to the fourth layer.

8. An apparatus, comprising:
- at least one processor configured to determine at least two first reference signal resources; and
- a transceiver is configured to:
  - receive a first channel based on a first target reference signal resource in response to a scheduling offset being less than or equal to a preset threshold, wherein the first target reference signal resource belongs to the at least two first reference signal resources and is determined based on first information, and wherein the first information is information about downlink control information (DCI) for scheduling the first channel, wherein the first target reference signal resource is a reference signal resource corresponding to a control resource set (CORESET) that is in a slot closest to the first channel and that has a smallest index value in CORESETs having an association relationship with the first information, and wherein the first channel carries a first type of data and a second type of data, wherein the first target reference signal resource is used to demodulate the first type of data:
wherein the at least one processor is further configured to:
- determine a second target reference signal resource from the at least two first reference signal resources, wherein the second target reference signal resource is used to demodulate the second type of data.

9. The apparatus according to claim 8, wherein the first information comprises at least one of the following:
- an index number of a control resource set in which the DCI for scheduling the first channel is located;
- an index number of a search space set in which the DCI for scheduling the first channel is located;
- an antenna port field carried in the DCI for scheduling the first channel;
- a transport block field carried in the DCI for scheduling the first channel;
- repetition times indication information carried in the DCI for scheduling the first channel; or
- a transmission configuration indicator field carried in the DCI for scheduling the first channel.

10. The apparatus according to claim 8, wherein the at least one processor is further configured to:
- determine at least one reference signal resource from the at least two first reference signal resources as the first target reference signal resource; and
- demodulate the first channel based on the first target reference signal resource.

11. The apparatus according to claim 10, wherein the determining the at least one reference signal resource from the at least two first reference signal resources as the first target reference signal resource comprises:
- determining the at least one reference signal resource from the at least two first reference signal resources as the first target reference signal resource based on the first information.

12. The apparatus according to claim 8, wherein the first target reference signal resource is associated with one of the at least two first reference signal resources, and wherein the second target reference signal resource is associated with a different one of the at least two first reference signal resources.

13. The apparatus according to claim 8, wherein the first type of data is a first codeword, and the second type of data is a second codeword.

14. The apparatus according to claim 8, wherein the first type of data is data from a first layer to a second layer, and the second type of data is data from a third layer to the fourth layer.

* * * * *

UNITED STATES PATENT AND TRADEMARK OFFICE
CERTIFICATE OF CORRECTION

PATENT NO. : 12,114,319 B2
APPLICATION NO. : 17/372222
DATED : October 8, 2024
INVENTOR(S) : Zhang et al.

Page 1 of 1

It is certified that error appears in the above-identified patent and that said Letters Patent is hereby corrected as shown below:

In the Claims

Claim 8: Column 52, Line 8: "late the first type of data:" should read as -- late the first type of data; --.

Signed and Sealed this
Twentieth Day of May, 2025

Coke Morgan Stewart
*Acting Director of the United States Patent and Trademark Office*